United States Patent
Fraaije et al.

(10) Patent No.: US 7,094,724 B2
(45) Date of Patent: *Aug. 22, 2006

(54) CATALYTIC SOLID SUPPORTED ON CALCINED HYDROTALCITE FOR OLEFINIC POLYMERISATION

(75) Inventors: Volker Fraaije, Frankfurt (DE); Markus Oberhoff, Speyer (DE); Nicola (Hüsgen) Paczkowski, Loveland, OH (US); Markus Schopf, Mannheim (DE); Wolfgang Bidell, Brussels (DE); Joachim Wulff-Döring, Frankenthal (DE); Shahram Mihan, Ludwigshafen (DE)

(73) Assignee: Bassell Polyelefine GmbH, Wessling (DE)

( * ) Notice: Subject to any disclaimer, the term of this patent is extended or adjusted under 35 U.S.C. 154(b) by 220 days.

This patent is subject to a terminal disclaimer.

(21) Appl. No.: 10/297,996

(22) PCT Filed: Jun. 13, 2001

(86) PCT No.: PCT/EP01/06664

§ 371 (c)(1),
(2), (4) Date: Dec. 12, 2002

(87) PCT Pub. No.: WO01/96418

PCT Pub. Date: Dec. 20, 2001

(65) Prior Publication Data

US 2003/0176275 A1      Sep. 18, 2003

(30) Foreign Application Priority Data

Jun. 13, 2000   (DE)   .................. 100 28 432

(51) Int. Cl.
*B01J 31/00*        (2006.01)

(52) U.S. Cl. .................. 502/150; 502/110; 502/115; 502/132; 502/133; 526/160; 526/904

(58) Field of Classification Search .......... 502/150, 502/110, 115, 132, 133; 526/160, 904
See application file for complete search history.

(56) References Cited

U.S. PATENT DOCUMENTS 5,245,096 A  *  9/1993  Derouane et al. ........... 585/419

(Continued)

FOREIGN PATENT DOCUMENTS

CA         2053900        10/1990

(Continued)

OTHER PUBLICATIONS

Chen et al. "One-step synthesis of methyl isobutyl ketone form acetone with calcined Mg/Al hydrotalcite-supported palladium or nickel catalysts" Applied □□ Catalysis A: General 169 (1998) pp. 207-214.*

(Continued)

*Primary Examiner*—J. A. Lorengo
*Assistant Examiner*—Jennine Brown
(74) *Attorney, Agent, or Firm*—Novak Druce & Quigg, LLP; Jason D. Voight

(57) ABSTRACT

Catalyst solid for olefin polymerization comprising
A) at least one calcined hydrotalcite and
B) at least one organic transition metal compound,
and also a catalyst system comprising the catalyst solid, the use of the catalyst solid for the polymerization or copolymerization of olefins and a process for preparing polyolefins by polymerization or copolymerization of olefins in the presence of the catalyst solid.

8 Claims, 4 Drawing Sheets

U.S. PATENT DOCUMENTS

| | | | | |
|---|---|---|---|---|
| 5,608,132 | A * | 3/1997 | Matsumoto et al. | 585/452 |
| 5,679,837 | A * | 10/1997 | Shinoda | 560/239 |
| 5,703,149 | A * | 12/1997 | Rotzinger et al. | 524/116 |
| 5,705,136 | A * | 1/1998 | Drago et al. | 423/239.1 |
| 5,817,596 | A * | 10/1998 | Akporiaye et al. | 502/327 |
| 5,846,406 | A * | 12/1998 | Sudhakar et al. | 208/216 R |
| 5,851,382 | A * | 12/1998 | Sudhakar | 208/216 R |
| 5,891,235 | A * | 4/1999 | Suzuki et al. | 106/483 |
| 5,891,820 | A * | 4/1999 | King | 502/313 |
| 5,939,353 | A * | 8/1999 | Bhattacharyya et al. | 423/600 |
| 5,941,037 | A * | 8/1999 | Hallock et al. | 52/407.1 |
| 5,955,048 | A * | 9/1999 | Cedro et al. | 423/306 |
| 6,028,023 | A * | 2/2000 | Vierheilig | 502/84 |
| 6,124,410 | A * | 9/2000 | Ito et al. | 526/77 |
| 6,180,764 | B1 | 1/2001 | Noweck et al. | 534/15 |
| 6,255,418 | B1 | 7/2001 | Jolly et al. | 526/160 |
| 6,268,063 | B1 * | 7/2001 | Kaminaka et al. | 428/500 |
| 6,313,063 | B1 * | 11/2001 | Rytter et al. | 502/327 |
| 6,403,743 | B1 * | 6/2002 | Clark et al. | 526/290 |
| 6,410,662 | B1 * | 6/2002 | Ushioda et al. | 526/127 |
| 6,417,302 | B1 | 7/2002 | Bohnen | 526/160 |
| 6,455,735 | B1 * | 9/2002 | Choudary et al. | 564/298 |
| 6,479,598 | B1 * | 11/2002 | Lewtas et al. | 526/69 |
| 6,586,360 | B1 * | 7/2003 | Ingallina et al. | 502/353 |
| 6,828,463 | B1 * | 12/2004 | Choudhary et al. | 568/320 |
| 6,911,413 | B1 * | 6/2005 | Wu et al. | 502/344 |
| 6,924,248 | B1 * | 8/2005 | Mihan et al. | 502/132 |
| 2004/0164028 | A1 * | 8/2004 | Corma et al. | 210/749 |

FOREIGN PATENT DOCUMENTS

| | | |
|---|---|---|
| CA | 2237231 | 11/1999 |
| DE | 2163851 | 6/1973 |
| DE | 19710615 | 9/1989 |
| EP | 982328 | 3/2000 |
| WO | 90/13533 | 11/1990 |
| WO | 91/09882 | 7/1991 |
| WO | 96/00243 | 1/1996 |
| WO | 96/23727 | 8/1996 |
| WO | 98/22486 | 5/1998 |
| WO | 98/40419 | 9/1998 |
| WO | 99/06414 | 2/1999 |
| WO | 00/05277 | 2/2000 |
| WO | 00/31090 | 6/2000 |
| WO | 01/09148 | 2/2001 |

OTHER PUBLICATIONS

Jutzi et al., *J. Org. Chem.*, 500, 1995, 175-185.
Enders et al., *Chem. Ber.*, 129, 459-463.
Wiesenfeldt et al., *J. Org. Chem.*, 369, 1989, 359-370.
Britovsek et al., *Chem. Commun.*, 1998, 849-850.
Small et al., *J. Am. Chem. Soc.*, 1998, 120, 4049-4050.

* cited by examiner

CATALYTIC SOLID SUPPORTED ON CALCINED HYDROTALCITE FOR OLEFINIC POLYMERISATION

The present invention relates to a catalyst solid comprising

A) at least one calcined hydrotalcite and

B) at least one organic transition metal compound.

Furthermore, the invention relates to a catalyst system comprising the catalyst solid, to the use of the catalyst solid for the polymerization or copolymerization of olefins and to a process for preparing polyolefins by polymerization or copolymerization of olefins in the presence of the catalyst solid.

Organic transition metal compounds such as metallocene complexes are of great interest as catalysts for olefin polymerization because they make it possible to synthesize polyolefins which cannot be obtained using conventional Ziegler-Natta catalysts. For example, such single-site catalysts lead to polymers having a narrow molar mass distribution and uniform incorporation of comonomers. For these to be able to be used successfully in polymerization processes in the gas phase or in suspension, it is often advantageous to use the metallocenes in the form of a solid, i.e. for them to be applied to a solid support. Furthermore, the supported catalysts have a high productivity.

As solid support materials for catalysts for olefin polymerization, use is frequently made of silica gels, since particles having a size and structure which makes them suitable as supports for olefin polymerization can be produced from this material. Spray-dried silica gels which consist of spherical agglomerates of smaller granular particles, known as the primary particles, have been found to be particularly useful for this purpose.

However, the use of silica gels as support material has been found to be disadvantageous in some applications. In the production of film products, specks caused by silica gel particles remaining in the polymer can be formed. The production of fiber products is also problematical. Here, a melt filtration is usually carried out prior to spinning. If the amounts of particulate catalyst residues in the polymers are too high, pressure can build up on the sieve plate. This leads to considerable process engineering difficulties such as shortened filter operating times. Particulate catalyst residues can be determined analytically by examining melt preparations of the smallest sieve fraction of a sieved polymer, which is conspicuously enriched in the contaminant, under an optical microscope.

Hydrotalcites are inorganic materials from which it is likewise possible to produce particles in sizes and with morphologies which make them appear suitable as supports for the preparation of catalysts for olefin polymerization. Subsequent calcination enables, inter alia, the desired content of hydroxyl groups to be set. Furthermore, it also changes the crystal structure.

CA-A 2 237 231 describes a heterogeneous olefin polymerization catalyst composition comprising an organometallic complex of a metal of groups 3 to 10 of the Periodic Table of the Elements with at least one ligand of the cyclopentadienyl type, an activator and a hydrotalcite, with the catalyst composition being prepared by spray drying a mixture of the components.

WO 90/13533 discloses that calcined hydrotalcites act as catalysts for the ethoxylation or propoxylation of fatty acid esters. Furthermore, DE-A 21 63 851 discloses that calcined hydrotalcites which have been halogenated after calcination are suitable as support materials for Ziegler-Natta catalysts for olefin polymerization.

It is an object of the present invention to provide a catalyst solid which results in a very small amount of interfering particulate catalyst residues, if any, remaining in the polymer, which gives a high catalyst activity in polymerization processes and which allows a simple work-up of the polymers after the polymerization.

We have found that this object is achieved by a catalyst solid for olefin polymerization comprising A) at least one calcined hydrotalcite and B) at least one organic transition metal compound.

We have also found a catalyst system comprising the catalyst solid, the use of the catalyst solid for the polymerization or copolymerization of olefins and a process for preparing polyolefins by polymerization or copolymerization of olefins in the presence of the catalyst solid.

The catalyst solids of the present invention are suitable for the polymerization of olefins and especially for the polymerization of α-olefins, i.e. hydrocarbons having terminal double bonds. Suitable monomers also include functionalized olefinically unsaturated compounds such as ester or amide derivatives of acrylic or methacrylic acid, for example acrylates, methacrylates or acrylonitrile. Preference is given to nonpolar olefinic compounds, including aryl-substituted α-olefins. Particularly preferred α-olefins are linear or branched $C_2$–$C_{12}$-1-alkenes, in particular linear $C_2$–$C_{10}$-1-alkenes such as ethylene, propylene, 1-butene, 1-pentene, 1-hexene, 1-heptene, 1-octene, 1-decene or branched $C_2$–$C_{10}$-1-alkenes such as 4-methyl-1-pentene, conjugated and nonconjugated dienes such as 1,3-butadiene, 1,4-hexadiene or 1,7-octadiene or vinylaromatic compounds such as styrene or substituted styrene. It is also possible to polymerize mixtures of various α-olefins.

Suitable olefins also include ones in which the double bond is part of a cyclic structure which can have one or more ring systems. Examples are cyclopentene, norbornene, tetracyclododecene and methylnorbornene and dienes such as 5-ethylidene-2-norbornene, norbornadiene or ethylnorbornadiene.

Mixtures of two or more olefins can also be polymerized.

In particular, the catalyst solids of the present invention can be used for the polymerization or copolymerization of ethylene or propylene. As comonomers in the polymerization of ethylene, preference is given to using $C_3$–$C_8$-α-olefins, in particular 1-butene, 1-pentene, 1-hexene and/or 1-octene. In the polymerization of propylene, preferred comonomers are ethylene and/or butene.

The catalyst solids of the present invention comprise at least one calcined hydrotalcite.

In mineralogy, hydrotalcite is a natural mineral having the ideal formula $$Mg_6Al_2(OH)_{16}CO_3 \cdot 4H_2O$$

whose structure is derived from that of brucite $Mg(OH)_2$. Brucite crystallizes in a sheet structure with the metal ions in octahedral holes between two layers of close-packed hydroxyl ions, with only every second layer of the octahedral holes being occupied. In hydrotalcite, some magnesium ions are replaced by aluminum ions, as a result of which the packet of layers gains a positive charge. This is compensated by the anions which are located together with water of crystallization in the layers in between.

Such sheet structures are found not only in magnesium-aluminum hydroxides, but also generally in mixed metal hydroxides of the formula

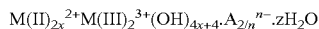

$$M(II)_{2x}^{2+}M(III)_{2}^{3+}(OH)_{4x+4} \cdot A_{2/n}^{n-} \cdot zH_2O$$

which have a sheet structure and in which M(II) is a divalent metal such as Mg, Zn, Cu, Ni, Co, Mn, Ca and/or Fe and M(III) is a trivalent metal such as Al, Fe, Co, Mn, La, Ce and/or Cr, x is from 0.5 to 10 in steps of 0.5, A is an interstitial anion and n is the charge on the interstitial anion which can be from 1 to 8, usually from 1 to 4, and z is an integer from 1 to 6, in particular from 2 to 4. Possible interstitial anions are organic anions such as alkoxide anions, alkyl ether sulfates, aryl ether sulfates or glycol ether sulfates, inorganic anions such as, in particular, carbonate, hydrogencarbonate, nitrate, chloride, sulfate or $B(OH)_4^-$ or polyoxo metal anions such as $Mo_7O_{24}^{6-}$ or $V_{10}O_{28}^{6-}$. However, a mixture of a plurality of such anions can also be present.

Accordingly, all such mixed metal hydroxides having a sheet structure should be regarded as hydrotalcites for the purposes of the present invention.

Suitable hydrotalcites are generally prepared synthetically. One possible way is to bring salts of the metals into solution and to combine these with one another under defined conditions. The process described in WO 96/23727, which comprises mixing alkoxides of the divalent and trivalent metals and hydrolyzing the mixtures with water, is preferred according to the present invention.

Calcined hydrotalcites can be prepared from hydrotalcites by calcination, i.e. heating. The preparation of the calcined hydrotalcites used according to the present invention is usually carried out at temperatures above 180° C. Preference is given to calcination for from 3 to 24 hours at from 250° C. to 1000° C., in particular from 400° C. to 700° C. It is possible for air or inert gas to be passed over the solid during calcination or for a vacuum to be applied.

On heating, the natural or synthetic hydrotalcites firstly give off water, i.e. drying occurs. On further heating, the actual calcination, the metal hydroxides are converted into the metal oxides by elimination of hydroxyl groups and interstitial anions; OH groups or interstitial anions such as carbonate can also still be present in the calcined hydrotalcites. A measure of this is the loss on ignition. This is the weight loss experienced by a sample which is heated in two steps firstly for 30 minutes at 200° C. in a drying oven and then for 1 hour at 950° C. in a muffle furnace.

The calcined hydrotalcites used as component A) are thus mixed oxides of the divalent and trivalent metals M(II) and M(III), with the molar ratio of M(II) to M(III) generally being in the range from 0.5 to 10, preferably from 0.75 to 8 and in particular from 1 to 4. Furthermore, normal amounts of impurities, for example Si, Fe, Na, Ca or Ti, can also be present.

Preferred calcined hydrotalcites A) are mixed oxides in which M(II) is magnesium and M(III) is aluminum. Such aluminum-magnesium mixed oxides are obtainable from Condea Chemie GmbH, Hamburg, under the trade name Puralox Mg.

In the calcined hydrotalcites used according to the present invention, the elimination of hydroxyl groups and interstitial anions or the conversion into the metal oxides does not have to be complete, i.e. partially calcined hydrotalcites can also be used for preparing the catalyst solids of the present invention. Preference is also given to calcined hydrotalcites in which the structural transformation is complete or virtually complete. Calcination, i.e. transformation of the structure, can be confirmed, for example, by means of X-ray diffraction patterns.

BRIEF DESCRIPTION OF THE DRAWINGS

FIG. 1 shows by way of example an X-ray diffraction pattern of the calcined aluminum-magnesium mixed oxide used in Example 1 measured on a powder diffractometer D 5000 from Siemens using Cu—$K_\alpha$ radiation. This pattern is characterized by peaks on the 2-theta scale at 35–37°, 43–45° and 62–64°. FIG. 4 shows the X-ray diffraction pattern of the starting material which displays, in particular, peaks at 11–14° and 22–25°. FIG. 2 shows an X-ray diffraction pattern of the partially calcined support material used according to the present invention in Example 6. This was likewise obtained from the starting material shown in FIG. 4. Both the peaks of the starting material and those of a calcined aluminum-magnesium mixed oxide can be seen. Nevertheless, the X-ray diffraction pattern differs significantly from that of the uncalcined starting material.

Figure 1:
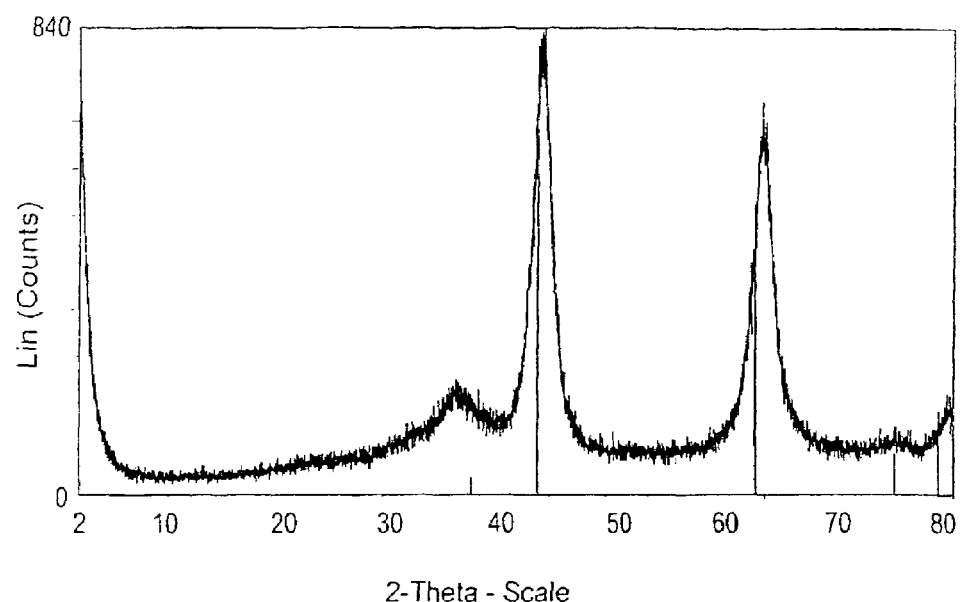
FIG. 1 shows an X-ray diffraction pattern of a magnesium-aluminum mixed oxide calcined at 550° C. for 3 hours

The calcined hydrotalcites used according to the present invention are generally employed as finely divided powders having a mean particle diameter $d_{50}$ of from 5 to 200 μm, preferably from 10 to 150 μm, particularly preferably from 15 to 100 μm and in particular from 20 to 70 μm.

The particulate calcined hydrotalcites usually have pore volumes of from 0.1 to 10 cm³/g, preferably from 0.2 to 4 cm³/g, and specific surface areas of from 30 to 1000 m²/g, preferably from 50 to 500 m²/g and in particular from 100 to 300 m²/g.

The support material used according to the present invention can, in addition, also be treated chemically using customary desiccants such as metal alkyls, chlorosilanes or $SiCl_4$. Appropriate treatment methods are described, for example, in WO 00/31090.

As organic transition metal compound B), it is in principle possible to use all compounds of the transition metals of groups 3 to 12 of the Periodic Table or the lanthanides which contain organic groups and preferably form active catalysts for olefin polymerization after reaction with the components C) and/or D) or D'). These are usually compounds in which at least one monodentate or polydentate ligand is bound to the central atom via a sigma or pi bond. Possible ligands include both ligands containing cyclopentadienyl radicals and ones which are free of cyclopentadienyl radicals. A large number of such compounds B) suitable for olefin polymerization are described in Chem. Rev. 2000, Vol. 100, No. 4. Furthermore, multinuclear cyclopentadienyl complexes are also suitable for olefin polymerization.

Suitable compounds B) are, for example, transition metal complexes with at least one ligand of the formulae F-I to F-V,

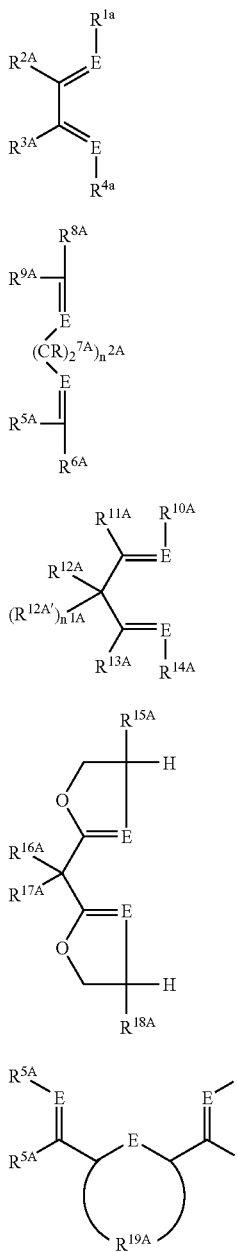

F-I

F-II

F-III

F-IV

F-V where the transition metal is selected from among the elements Ti, Zr, Hf, Sc, V, Nb, Ta, Cr, Mo, W, Fe, Co, Ni, Pd, Pt and the elements of the rare earth metals. Preference is given to using compounds having nickel, iron, cobalt and palladium as central metal.

E is an element of group 15 of the Periodic Table of the Elements, preferably N or P, with particular preference being given to N. The two or three atoms E in a molecule can be identical or different.

The radicals $R^{1A}$ to $R^{19A}$, which may be identical or different within a ligand system F-I to F-V, are as follows:

$R^{1A}$ and $R^{4A}$ are each, independently of one another, a hydrocarbon radical or a substituted hydrocarbon radical, preferably a hydrocarbon radical in which the carbon atom adjacent to the element E is bound to at least two carbon atoms, $R^{2A}$ and $R^{3A}$ are each, independently of one another, hydrogen, a hydrocarbon radical or a substituted hydrocarbon radical, where $R^{2A}$ and $R^{3A}$ may also together form a ring system in which one or more heteroatoms may be present, $R^{6A}$ and $R^{8A}$ are each, independently of one another, a hydrocarbon radical or a substituted hydrocarbon radical, $R^{5A}$ and $R^{9A}$ are each, independently of one another, hydrogen, a hydrocarbon radical or a substituted hydrocarbon radical, where $R^{6A}$ and $R^{5A}$ or $R^{8A}$ and $R^{9A}$ may also together form a ring system, $R^{7A}$ are each, independently of one another, hydrogen, a hydrocarbon radical or a substituted hydrocarbon radical, where two $R^{7A}$ may also together form a ring system, $R^{10A}$ and $R^{14A}$ are each, independently of one another, a hydrocarbon radical or a substituted hydrocarbon radical, $R^{11A}$, $R^{12A}$, $R^{12A'}$ and $R^{13A}$ are each, independently of one another, hydrogen, a hydrocarbon radical or a substituted hydrocarbon radical, where two or more geminal or vicinal radicals $R^{11A}$, $R^{12A}$, $R^{12A'}$ and $R^{13A}$ may also together form a ring system, $R^{15A}$ and $R^{18A}$ are each, independently of one another, hydrogen, a hydrocarbon radical or a substituted hydrocarbon radical, $R^{16A}$ and $R^{17A}$ are each, independently of one another, hydrogen, a hydrocarbon radical or a substituted hydrocarbon radical, $R^{19A}$ is an organic radical which forms a 5- to 7-membered substituted or unsubstituted, in particular unsaturated or aromatic, heterocyclic ring system, in particular together with E forms a pyridine system, $n^{1A}$ is 0 or 1, with F-III being negatively charged when $n^{1A}$ is 0, and $n^{2A}$ is an integer from 1 to 4, preferably 2 or 3.

Particularly useful transition metal complexes containing ligands of the formulae F-I to F-IV are, for example, complexes of the transition metals Fe, Co, Ni, Pd or Pt with ligands of the formula F-I. Particular preference is given to diimine complexes of Ni or Pd, e.g.:

di(2,6-di-i-propylphenyl)-2,3-dimethyldiazabutadienepalladium dichloride, di(di-i-propylphenyl)-2,3-dimethyldiazabutadienenickel dichloride, di(2,6-di-i-propylphenyl)dimethyldiazabutadienedimethylpalladium, di(2,6-di-i-propylphenyl)-2,3-dimethyldiazabutadienedimethylnickel, di(2,6-dimethylphenyl)-2,3-dimethyldiazabutadienepalladium dichloride, di(2,6-dimethylphenyl)-2,3-dimethyldiazabutadienenickel dichloride, di(2,6-dimethylphenyl)-2,3-dimethyldiazabutadienedimethylpalladium, di(2,6-dimethylphenyl)-2,3-dimethyldiazabutadienedimethylnickel, di(2-methylphenyl)-2,3-dimethyldiazabutadienepalladium dichloride, di(2-methylphenyl)-2,3-dimethyldiazabutadienenickel dichloride, di(2-methylphenyl)-2,3-dimethyldiazabutadienedimethylpalladium, di(2-methenyleyl)-2,3-dimethyldiazabutadienedimethylnickel, diphenyl-2,3-dimethyldiazabutadienepalladium dichloride, diphenyl-2,3-dimethyldiazabutadienenickel dichloride,
diphenyl-2,3-dimethyldiazabutadienedimethylpalladium,
diphenyl-2,3-dimethyldiazabutadienedimethylnickel,
di(2,6-dimethylphenyl)azanaphthenepalladium dichloride,
di(2,6-dimethylphenyl)azanaphthenenickel dichloride,
di(2,6-dimethylphenyl)azanaphthenedimethylpalladium,
di(2,6-dimethylphenyl)azanaphthenedimethylnickel,
1,1'-bipyridylpalladium dichloride,
1,1'-bipyridylnickel dichloride,
1,1'-bipyridyl(dimethyl)palladium,
1,1'-bipyridyl(dimethyl)nickel.

Particularly useful compounds F-V also include those which are described in J. Am. Chem. Soc. 120, p. 4049 ff. (1998), J. Chem. Soc., Commun. 1998, 849. Preferred complexes containing the ligands F-V are 2,6-bis(imino) pyridyl complexes of the transition metals Fe, Co, Ni, Pd and Pt, in particular Fe.

Iminophenoxide complexes can also be used as organic transition metal compound B). The ligands of these complexes can be prepared, for example, from substituted or unsubstituted salicylaldehydes and primary amines, in particular substituted or unsubstituted arylamines. Transition metal complexes with pi ligands having one or more heteroatoms in the pi system, for example the boratabenzene ligand, the pyrrolyl anion or the phospholyl anion, can also be used as organic transition metal compounds B).

Particularly useful organic transition metal compounds B) include those having at least one cyclopentadienyl-type ligand, which are generally referred to as metallocene complexes. Particularly useful metallocene complexes are those of the formula (I)

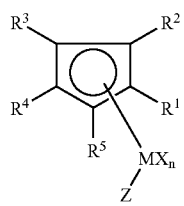

(I)

where the substituents and indices have the following meanings:

M is titanium, zirconium, hafnium, vanadium, niobium, tantalum, chromium, molybdenum or tungsten or an element of group 3 of the Periodic Table and the lanthanides, X is fluorine, chlorine, bromine, iodine, hydrogen, $C_1$–$C_{10}$-alkyl, $C_2$–$C_{10}$-alkenyl, $C_6$–$C_{15}$-aryl, alkylaryl having from 1 to 10 carbon atoms in the alkyl part and from 6 to 20 carbon atoms in the aryl part, —$OR^6$ or —$NR^6R^7$, or two radicals X may form a substituted or unsubstituted diene ligand, in particular a 1,3-diene ligand, and n is 1, 2 or 3 and has a value such that, depending on the valence of M, the metallocene complex of the formula (I) is uncharged, where $R^6$ and $R^7$ are each $C_1$–$C_{10}$-alkyl, $C_6$–$C_{15}$-aryl, alkylaryl, arylalkyl, fluoroalkyl or fluoroaryl each having from 1 to 10 carbon atoms in the alkyl radical and from 6 to 20 carbon atoms in the aryl radical and the radicals X are identical or different and may be joined to one another, $R^1$ to $R^5$ are each hydrogen, $C_1$–$C_{22}$-alkyl, 5- to 7-membered cycloalkyl or cycloalkenyl which may in turn bear $C_1$–$C_{10}$-alkyl groups as substituents, $C_2$–$C_{22}$-alkenyl, $C_6$–$C_{22}$-aryl, alkylaryl or arylalkyl, where two adjacent radicals may also together form a saturated or unsaturated cyclic group having from 4 to 44 carbon atoms, or $Si(R^8)_3$ where $R^8$ are identical or different and are each $C_1$–$C_{10}$-alkyl, $C_3$–$C_{10}$-cycloalkyl, $C_6$–$C_{15}$-aryl, $C_1$–$C_4$-alkoxy or $C_6$–$C_{10}$-aryloxy, and Z is as defined for X or is

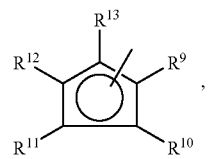

where the radicals $R^9$ to $R^{13}$ are each hydrogen, $C_1$–$C_{22}$-alkyl, 5- to 7-membered cycloalkyl or cycloalkenyl which may in turn bear $C_1$–$C_{10}$-alkyl groups as substituents, $C_2$–$C_{22}$-alkenyl, $C_6$–$C_{22}$-aryl, alkylaryl or arylalkyl, where two adjacent radicals may also together form a saturated or unsaturated cyclic group having from 4 to 44 carbon atoms, or $Si(R^{14})_3$ where $R^{14}$ are identical or different and are each $C_1$–$C_{10}$-alkyl, $C_3$–$C_{10}$-cycloalkyl, $C_6$–$C_{15}$-aryl, $C_1$–$C_4$-alkoxy or $C_6$–$C_{10}$-aryloxy, or the radicals $R^4$ and Z together form a —$R^{15}$—A— group, where $R^{15}$ is

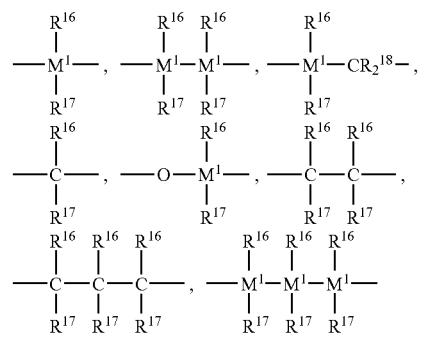

$=BR^{16}$, $=BNR^{16}R^{17}$, $=AlR^{16}$, —Ge—, —Sn—, —O—, —S—, $=SO$, $=SO_2$, $=NR^{16}$, $=CO$, $=PR^{16}$ or $=P(O)R^{16}$, where $R^{16}$, $R^{17}$ and $R^{18}$ are identical or different and are each a hydrogen atom, a halogen atom, a trimethylsilyl group, a $C_1$–$C_{10}$-alkyl group, a $C_1$–$C_{10}$-fluoroalkyl group, a $C_6$–$C_{10}$-fluoroaryl group, a $C_6$–$C_{10}$-aryl group, a $C_1$–$C_{10}$-alkoxy group, a $C_7$–$C_{15}$-alkylaryloxy group, a $C_2$–$C_{10}$-alkenyl group, a $C_7$–$C_{40}$-arylalkyl group a $C_8$–$C_{40}$-arylalkenyl group or a $C_7$–$C_{40}$-alkylaryl group or two adjacent radicals together with the atoms connecting them form a saturated or unsaturated ring having from 4 to 15 carbon atoms, and $M^1$ is silicon, germanium or tin, A is —O—, —S—,

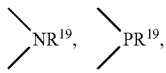

—O—$R^{19}$, —$NR^{19}{}_2$ or —$PR^{19}{}_2$, where $R^{19}$ are each, independently of one another, $C_1$–$C_{10}$-alkyl, $C_6$–$C_{15}$-aryl, $C_3$–$C_{10}$-cycloalkyl, $C_7$–$C_{18}$-alkylaryl or $Si(R^{20})_3$, $R^{20}$ is hydrogen, $C_1$–$C_{10}$-alkyl, $C_6$–$C_{15}$-aryl which may in turn bear $C_1$–$C_4$-alkyl groups as substituents or $C_3$–$C_{10}$-cycloalkyl, or the radicals $R^4$ and $R^{12}$ together form a —$R^{15}$— group.

The radicals X in the formula (I) are preferably identical and are preferably each fluorine, chlorine, bromine, $C_1$–$C_7$-alkyl or aralkyl, in particular chlorine, methyl or benzyl.

Among the metallocene complexes of the formula (I), preference is given to

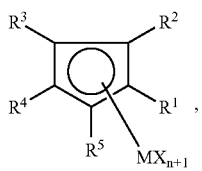
(Ia)

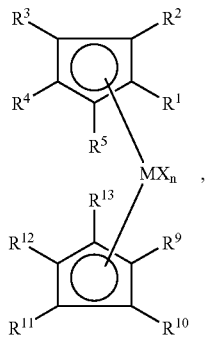
(Ib)

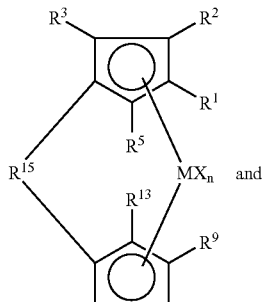
(Ic)

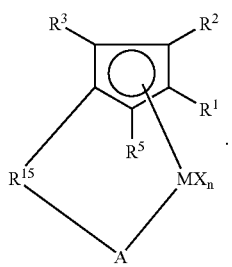
(Id)

Among the compounds of the formula (Ia), particular preference is given to those in which M is titanium, zirconium or hafnium, X is chlorine, $C_1$–$C_4$-alkyl, phenyl, alkoxy or aryloxy, n is 1 or 2 and $R^1$ to $R^5$ are each hydrogen or $C_1$–$C_4$-alkyl.

Among the compounds of the formula (Ib), preference is given to those in which

M is titanium, zirconium or hafnium,

X is chlorine, $C_1$–$C_4$-alkyl or benzyl, or two radicals X form a substituted or unsubstituted butadiene ligand, n is 2, $R^1$ to $R^5$ are each hydrogen, $C_1$–$C_4$-alkyl or $Si(R^8)_3$ and $R^9$ to $R^{13}$ are each hydrogen, $C_1$–$C_4$-alkyl or $Si(R^{14})_3$, or two radicals $R^1$ to $R^5$ and/or $R^9$ to $R^{13}$ together with the $C_5$ ring form an indenyl or substituted indenyl system.

Particular preference is given to compounds of the formula (Ib) in which the cyclopentadienyl radicals are identical.

Examples of particularly useful compounds include:
bis(cyclopentadienyl)zirconium dichloride,
bis(pentamethylcyclopentadienyl)zirconium dichloride,
bis(methylcyclopentadienyl)zirconium dichloride,
bis(ethylcyclopentadienyl)zirconium dichloride,
is(n-butylcyclopentadienyl)zirconium dichloride,
bis(1-n-butyl-3-methylcyclopentadienyl)zirconium dichloride,
bis(indenyl)zirconium dichloride,
bis(tetrahydroindenyl)zirconium dichloride and
bis(trimethylsilylcyclopentadienyl)zirconium dichloride
and also the corresponding dimethylzirconium compounds.

Particularly useful compounds of the formula (Ic) are ones in which $R^1$ and $R^9$ are identical or different and are each hydrogen or a $C_1$–$C_{10}$-alkyl group, $R^5$ and $R^{13}$ are identical or different and are each hydrogen or a methyl, ethyl, isopropyl or tert-butyl group, $R^3$ and $R^{11}$ are each $C_1$–$C_4$-alkyl and $R^2$ and $R^{10}$ are each hydrogen or two adjacent radicals $R^2$ and $R^3$ or $R^{10}$ and $R^{11}$ together form a saturated or unsaturated cyclic group having from 4 to 44 carbon atoms, $R^{15}$ is

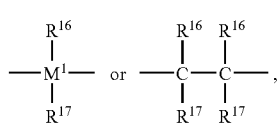

or =$BR^{16}$ or =$BNR^{16}R^{17}$,

M is titanium, zirconium or hafnium and

X are identical or different and are each chlorine, $C_1$–$C_4$-alkyl, benzyl, phenyl or $C_7$–$C_{15}$-alkylaryloxy.

Especially useful compounds of the formula (Ic) are those of the formula (Ic')

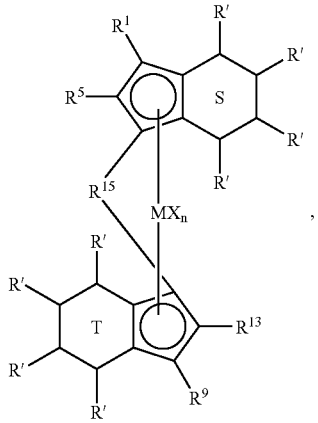 (Ic')

where
the radicals R' are identical or different and are each hydrogen, $C_1$–$C_{10}$-alkyl or $C_3$–$C_{10}$-cycloalkyl, preferably methyl, ethyl, isopropyl or cyclohexyl, $C_6$–$C_{20}$-aryl, preferably phenyl, naphthyl or mesityl, $C_7$–$C_{40}$-arylalkyl, $C_7$–$C_{40}$-alkylaryl, preferably 4-tert-butylphenyl or 3,5-di-tert-butylphenyl, or $C_8$–$C_{40}$-arylalkenyl, $R^5$ and $R^{13}$ are identical or different and are each hydrogen or $C_1$–$C_6$-alkyl, preferably methyl, ethyl, isopropyl, n-propyl, n-butyl, n-hexyl or tert-butyl, and the rings S and T are identical or different, saturated, unsaturated or partially saturated.

The indenyl or tetrahydroindenyl ligands of the metallocenes of the formula (Ic') are preferably substituted in the 2 position, the 2,4 positions, the 4,7 positions, the 2,4,7 positions, the 2,6 positions, the 2,4,6 positions, the 2,5,6 positions, the 2,4,5,6 positions or the 2,4,5,6,7 positions, in particular in the 2,4 positions, where the following nomenclature is employed for the site of substitution:

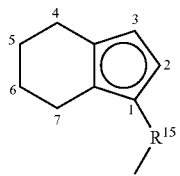

As complexes (Ic'), preference is given to using bridged bisindenyl complexes in the Rac or pseudo-Rac form, where the term pseudo-Rac refers to complexes in which the two indenyl ligands are in the Rac arrangement relative to one another when all other substituents of the complex are disregarded.

Examples of particularly useful complexes (Ic) and (Ic') include:
dimethylsilanediylbis(cyclopentadienyl)zirconium dichloride,
dimethylsilanediylbis(indenyl)zirconium dichloride,
dimethylsilanediylbis(tetrahydroindenyl)zirconium dichloride,
ethylenebis(cyclopentadienyl)zirconium dichloride,
ethylenebis(indenyl)zirconium dichloride,
ethylenebis(tetrahydroindenyl)zirconium dichloride,
tetramethylethylene-9-fluorenylcyclopentadienylzirconium dichloride,
dimethylsilanediylbis(3-tert-butyl-5-methylcyclopentadienyl)zirconium dichloride,
dimethylsilanediylbis(3-tert-butyl-5-ethylcyclopentadienyl) zirconium dichloride,
dimethylsilanediylbis(2-methylindenyl)zirconium dichloride,
dimethylsilanediylbis(2-isopropylindenyl)zirconium dichloride,
dimethylsilanediylbis(2-tert-butylindenyl)zirconium dichloride,
diethylsilanediylbis(2-methylindenyl)zirconium dibromide,
dimethylsilanediylbis(3-methyl-5-methylcyclopentadienyl) zirconium dichloride,
dimethylsilanediylbis(3-ethyl-5-isopropylcyclopentadienyl) zirconium dichloride,
dimethylsilanediylbis(2-ethylindenyl)zirconium dichloride,
dimethylsilanediylbis(2-methyl-4,5-benzindenyl)zirconium dichloride,
dimethylsilanediylbis(2-ethyl-4,5-benzindenyl)zirconium dichloride,
methylphenylsilanediylbis(2-methyl-4,5-benzindenyl)zirconium dichloride,
methylphenylsilanediylbis(2-ethyl-4,5-benzindenyl)zirconium dichloride,
diphenylsilanediylbis(2-methyl-4,5-benzindenyl)zirconium dichloride,
diphenylsilanediylbis(2-ethyl-4,5-benzindenyl)zirconium dichloride,
diphenylsilanediylbis(2-methylindenyl)hafnium dichloride,
dimethylsilanediylbis(2-methyl-4-phenylindenyl)zirconium dichloride,
dimethylsilanediylbis(2-ethyl-4-phenylindenyl)zirconium dichloride,
dimethylsilanediylbis(2-methyl-4-(1-naphthyl)indenyl)zirconium dichloride,
dimethylsilanediylbis(2-ethyl-4-(1-naphthyl)indenyl)zirconium dichloride,
dimethylsilanediylbis(2-propyl-4-(1-naphthyl)indenyl)zirconium dichloride,
dimethylsilanediylbis(2-i-butyl-4-(1-naphthyl)indenyl)zirconium dichloride,
dimethylsilanediylbis(2-propyl-4-(9-phenanthryl)indenyl) zirconium dichloride,
dimethylsilanediylbis(2-methyl-4-isopropylindenyl)zirconium dichloride,
dimethylsilanediylbis(2,7-dimethyl-4-isopropylindenyl)zirconium dichloride,
dimethylsilanediylbis(2-methyl-4,6-diisopropylindenyl)zirconium dichloride,
dimethylsilanediylbis(2-methyl 4-[p-trifluoromethylphenyl] indenyl)zirconium dichloride,
dimethylsilanediylbis(2-methyl-4-[3',5'-dimethylphenyl]indenyl)zirconium dichloride,
dimethylsilanediylbis(2-methyl-4-[4'-tert-butylphenyl]indenyl)zirconium dichloride,
diethylsilanediylbis(2-methyl-4-[4'-tert-butylphenyl]indenyl)zirconium dichloride,
dimethylsilanediylbis(2-ethyl-4-[4'-tert-butylphenyl]indenyl)zirconium dichloride,
dimethylsilanediylbis(2-propyl-4-[4'-tert-butylphenyl]indenyl)zirconium dichloride,
dimethylsilanediylbis(2-isopropyl-4-[4'-tert-butylphenyl]indenyl)zirconium dichloride,
dimethylsilanediylbis(2-n-butyl-4-[4'-tert-butylphenyl]indenyl)zirconium dichloride, dimethylsilanediylbis(2-hexyl-4-[4'-tert-butylphenyl]indenyl)zirconium dichloride,
dimethylsilanediyl(2-isopropyl-4-phenylindenyl)(2-methyl-4-phenylindenyl)zirconium dichloride,
dimethylsilanediyl(2-isopropyl-4-(1-naphthyl)indenyl)(2-methyl-4-(1-naphthyl)indenyl)zirconium dichloride,
dimethylsilanediyl(2-isopropyl-4-[4'-tert-butylphenyl]indenyl)(2-methyl-4-[4'-tert-butylphenyl]-indenyl)zirconium dichloride,
dimethylsilanediyl(2-isopropyl-4-[4'-tert-butylphenyl]indenyl)(2-ethyl-4-[4'-tert-butylphenyl]-indenyl)zirconium dichloride,
dimethylsilanediyl(2-isopropyl-4-[4'-tert-butylphenyl]indenyl)(2-methyl-4-[3',5'-bis-tert-butyl-phenyl]indenyl)zirconium dichloride,
dimethylsilanediyl(2-isopropyl-4-[4'-tert-butylphenyl]indenyl)(2-methyl-4-[1'-naphthyl]indenyl)-zirconium dichloride
and ethylene(2-isopropyl-4-[4'-tert-butylphenyl]indenyl)(2-methyl-4-[4'-tert-butylphenyl]indenyl)-zirconium dichloride and also the corresponding dimethylzirconium, monochloromono(alkylaryloxy)zirconium and di(alkylaryloxy)zirconium compounds.

Particularly useful compounds of the formula (Id) are those in which
M is titanium or zirconium, in particular titanium, and
X is chlorine, $C_1$–$C_4$-alkyl or phenyl or two radicals X form a substituted or unsubstituted butadiene ligand,
$R^{15}$ is

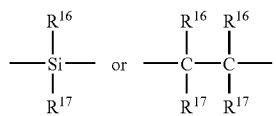

and
A is —O—, —S— or

$R^1$ to $R^3$ and $R^5$ are each hydrogen, $C_1$–$C_{10}$-alkyl, preferably methyl, $C_3$–$C_{10}$-cycloalkyl, $C_6$–$C_{15}$-aryl or $Si(R^8)_3$, or two adjacent radicals form a cyclic group having from 4 to 12 carbon atoms, with particular preference given to all $R^1$ to $R^3$ and $R^5$ being methyl.

Another group of particularly useful compounds of the formula (Id) are those in which
M is titanium or chromium in the oxidation state III and
X is chlorine, $C_1$–$C_4$-alkyl or phenyl or two radicals X form a substituted or unsubstituted butadiene ligand,
$R^{15}$ is

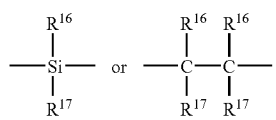

and
A is —O—$R^{19}$, —$NR^{19}_2$ or —$PR^{19}_2$,
$R^1$ to $R^3$ and $R^5$ are each hydrogen, $C_1$–$C_{10}$-alkyl, $C_3$–$C_{10}$-cycloalkyl, $C_6$–$C_{15}$-aryl or $Si(R^8)_3$, or two adjacent radicals form a cyclic group having from 4 to 12 carbon atoms.

The synthesis of such complexes can be carried out by methods known per se, preferably by reacting the appropriately substituted, cyclic hydrocarbon anions with halides of titanium, zirconium, hafnium, vanadium, niobium, tantalum or chromium.

Examples of appropriate methods of preparation are described, inter alia, in Journal of Organo-metallic Chemistry, 369 (1989), 359–370.

Further suitable organic transition metal compounds B) are metallocenes having at least one ligand formed from a cyclopentadienyl or heterocyclopentadienyl and a fused-on heterocycle, where, in the heterocycles, at least one carbon atom is replaced by a heteroatom, preferably from group 15 or 16 of the Periodic Table and in particular nitrogen or sulfur. Such compounds are described, for example, in WO 98/22486. These are, in particular:
dimethylsilanediyl(2-methyl-4-phenylindenyl)(2,5-dimethyl-N-phenyl-4-azapentalene)zirconium dichloride,
dimethylsilanediylbis(2-methyl-4-phenyl-4-hydroazulenyl) zirconium dichloride,
dimethylsilanediylbis(2-ethyl-4-phenyl-4-hydroazulenyl) zirconium dichloride.

Transition metal compounds B) which are suitable for the purposes of the present invention also include substituted monocyclopentadienyl, monoindenyl, monofluorenyl or heterocyclopentadienyl complexes of chromium, molybdenum or tungsten, where at least one of the substituents on the cyclopentadienyl ring bears a rigid donor function which is not bound exclusively via $sp^3$-hybridized carbon or silicon atoms. The most direct link to the donor function contains at least one sp- or $sp^2$-hybridized carbon atom, preferably from 1 to 3 $sp^2$-hybridized carbon atoms. The direct link preferably contains an unsaturated double bond, an aromatic or together with the donor forms a partially unsaturated or aromatic heterocyclic system.

In these transition metal compounds, the cyclopentadienyl ring can also be a heterocyclopentadienyl ligand, i.e. at least one carbon atom can be replaced by a heteroatom from group 15 or 16. In this case, a $C_5$-ring carbon atom is preferably replaced by phosphorus. In particular, the cyclopentadienyl ring is substituted by further alkyl groups which can also form a 5- or 6-membered ring such as tetrahydroindenyl, indenyl, benzindenyl or fluorenyl.

Possible donors are uncharged functional groups containing an element of group 15 or 16 of the Periodic Table, e.g. amine, imine, carboxamide, carboxylic ester, ketone (oxo), ether, thioketone, phosphine, phosphite, phosphine oxide, sulfonyl, sulfonamide or unsubstituted, substituted or fused, partially unsaturated heterocyclic or heteroaromatic ring systems.

Preference is given to using substituted monocyclopentadienyl, monoindenyl, monofluorenyl or heterocyclopentadienyl complexes of the formula (II)

where the variables have the following meanings:
$M^{1B}$ is chromium, molybdenum or tungsten, $Z^{1B}$ has the formula (IIa)

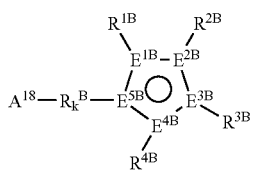

where the variables have the following meanings:
$E^{1B}$–$E^{5B}$ are each carbon or, for not more than one atom $E^{1B}$ to $E^{5B}$, phosphorus or nitrogen,
$A^{1B}$ is $NR^{5B}R^{6B}$, $PR^{5B}R^{6B}$, $OR^{5B}$, $SR^{5B}$ or an unsubstituted, substituted or fused, partially unsaturated heterocyclic or heteroaromatic ring system,
$R^{B}$ is one of the following groups:

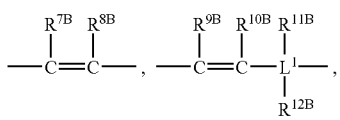

and, in addition, if $A^{1B}$ is an unsubstituted, substituted or fused, partially unsaturated heterocyclic or heteroaromatic ring system, may also be

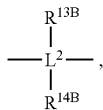

where
$L^1$, $L^2$ are each silicon or carbon,
k is 1 or, when $A^{1B}$ is an unsubstituted, substituted or fused, partially unsaturated heterocyclic or heteroaromatic ring system, may also be 0,
$X^{1B}$ are each, independently of one another, fluorine, chlorine, bromine, iodine, hydrogen, $C_1$–$C_{10}$-alkyl, $C_2$–$C_{10}$-alkenyl, $C_6$–$C_{20}$-aryl, alkylaryl having 1–10 carbon atoms in the alkyl part and 6–20 carbon atoms in the aryl part, $NR^{15B}R^{16B}$, $OR^{15B}$, $SR^{15B}$, $SO_3R^{15B}$, $OC(O)R^{15B}$, CN, SCN, β-diketonate, CO, $BF_4^-$, $PF_6^-$ or a bulky noncoordinating anion,
$R^{1B}$–$R^{16B}$ are each, independently of one another, hydrogen, $C_1$–$C_{20}$-alkyl, $C_2$–$C_{20}$-alkenyl, $C_6$–$C_{20}$-aryl, alkylaryl having from 1 to 10 carbon atoms in the alkyl part and 6–20 carbon atoms in the aryl part, $SiR^{17B}_3$, where the organic radicals $R^{1B}$–$R^{16B}$ may also be substituted by halogens and two geminal or vicinal radicals $R^{1B}$–$R^{16B}$ may also be joined to form a five- or six-membered ring,
$R^{17B}$ are each, independently of one another, hydrogen, $C_1$–$C_{20}$-alkyl, $C_2$–$C_{20}$-alkenyl, $C_6$–$C_{20}$-aryl, alkylaryl having from 1 to 10 carbon atoms in the alkyl part and 6–20 carbon atoms in the aryl part and two geminal radicals $R^{17B}$ may also be joined to form a five- or six-membered ring,
$n^{1B}$ is 1, 2 or 3 and
$m^{1B}$ is 1, 2 or 3.

As transition metal $M^{1B}$, particular preference is given to chromium.

$Z^{1B}$ is a substituted cyclopentadienyl system, and the radical —$R^B_k$—$A^{1B}$ bears a rigid bound donor function. The cyclopentadienyl ring is bound to the transition metal via a $\eta^5$ bond. The donor can be bound via a coordinate bond or not be coordinated. The donor is preferably coordinated intramolecularly to the metal center.

$E^{1B}$ to $E^{5B}$ are preferably four carbon atoms and one phosphorus atom or carbon atoms only; very particular preference is given to all $E^{1B}$ to $E^{5B}$ being carbon.

$A^{1B}$ can, for example, together with the bridge $R^B$ form an amine, ether, thioether or phosphine. Moreover, $A^{1B}$ can also be an unsubstituted, substituted or fused, heterocyclic aromatic ring system which can contain heteroatoms from the group consisting of oxygen, sulfur, nitrogen and phosphorus in addition to ring carbons. Examples of 5-membered heteroaryl groups which can contain from 1 to 4 carbon atoms and/or one sulfur or oxygen atom as ring atoms in addition to carbon atoms are 2-furyl, 2-thienyl, 2-pyrrolyl, 3-isoxazolyl, 5-isoxazolyl, 3-isothiazolyl, 5-isothiazolyl, 1-pyrazolyl, 3-pyrazolyl, 5-pyrazolyl, 2-oxazolyl, 4-oxazolyl, 5-oxazolyl, 2-thiazolyl, 4-thiazolyl, 5-thiazolyl, 2-imidazolyl, 4-imidazolyl, 5-imidazolyl, 1,2,4-oxadiazol-3-yl, 1,2,4-oxadiazol-5-yl, 1,3,4-oxadiazol-2-yl or 1,2,4-triazol-3-yl. Examples of 6-membered heteroaryl groups which can contain from 1 to 4 nitrogen atoms and/or one phosphorus atom are 2-pyridinyl, 2-phosphabenzolyl 3-pyridazinyl, 2-pyrimidinyl, 4-pyrimidinyl, 2-pyrazinyl, 1,3,5-triazin-2-yl and 1,2,4-triazin-3-yl, 1,2,4-triazin-5-yl or 1,2,4-triazin-6-yl. The 5-membered and 6-membered heteroaryl groups can also be substituted by $C_1$–$C_{10}$-alkyl, $C_6$–$C_{10}$-aryl, alkylaryl having from 1 to 10 carbon atoms in the alkyl part and 6–10 carbon atoms in the aryl part, trialkylsilyl or halogens such as fluorine, chlorine or bromine or be fused with one or more aromatics or heteroaromatics. Examples of benzo-fused 5-membered heteroaryl groups are 2-indolyl, 7-indolyl, 2-coumaronyl, 7-coumaronyl, 2-thianaphthenyl, 7-thianaphthenyl, 3-indazolyl, 7-indazolyl, 2-benzimidazolyl or 7-benzimidazolyl. Examples of benzo-fused 6-membered heteroaryl groups are 2-quinolyl, 8-quinolyl, 3-cinnolyl, 8-cinnolyl, 1-phthalazyl, 2-quinazolyl, 4-quinazolyl, 8-quinazolyl, 5-quinoxalyl, 4-acridyl, 1-phenanthridyl or 1-phenazyl. Nomenclature and numbering of the heterocycles has been-taken from L. Fieser and M. Fieser, Lehrbuch der organischen Chemie, 3rd Revised Edition, Verlag Chemie, Weinheim 1957. In a preferred embodiment, $A^{1B}$ is an unsubstituted, substituted or fused, heteroaromatic ring system or $NR^{5B}R^{6B}$. Here, preference is given to simple systems which are readily available and cheap and are selected from the following group:

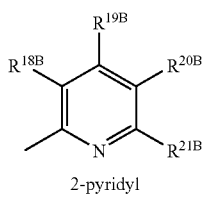

2-pyridyl

-continued

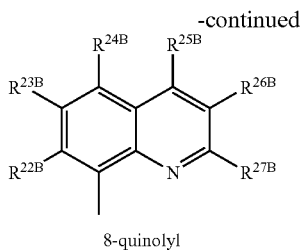

8-quinolyl

Possible substituents $R^{18B}$ to $R^{27B}$ are the same radicals as described for $R^{1B}$–$R^{16B}$ and halogens such as fluorine, chlorine or bromine, with two vicinal radicals $R^{18B}$ to $R^{27B}$ also being able to be joined to form a 5- or 6-membered ring and also being able to be substituted by halogens such as fluorine, chlorine or bromine. Preferred radicals $R^{18B}$ to $R^{27B}$B are hydrogen, methyl, ethyl, n-propyl, n-butyl, tert-butyl, n-pentyl, n-hexyl, n-heptyl, n-octyl, vinyl, allyl, benzyl, phenyl, naphthyl, biphenyl and anthranyl, and also fluorine, chlorine and bromine. Possible organosilicon substituents are, in particular, trialkylsilyl groups having from 1 to 10 carbon atoms in the alkyl radical, especially trimethylsilyl groups. Very particular preference is given to $A^{1B}$ being an unsubstituted or substituted, e.g. alkyl-substituted, quinolyl, in particular one bound in position 8, e.g. 8-quinolyl, 8-(2-methylquinolyl), 8-(2,3,4-trimethylquinolyl), 8-(2,3,4,5,6,7-hexamethylquinolyl). It is very simple to prepare and at the same time gives very good activities.

The rigid bridge $R^B$ between the cyclopentadienyl ring and the functional group $A^{1B}$ is an organic diradical comprising carbon and/or silicon units and having a chain length of from 1 to 3. $R^B$ can be bound to $A^{1B}$ via $L^1$ or via $CR^9$. Owing to the ease of preparation, preference is given to the combination of $R^B$=CH=CH or 1,2-phenylene with $A^{1B}$=NR$^{5B}$R$^{6B}$, and also $R^B$=CH$_2$, C(CH$_3$)$_2$ or Si(CH$_3$)$_2$ with $A^{1B}$=unsubstituted or substituted 8-quinolyl or unsubstituted or substituted 2-pyridyl. Systems without a bridge $R^B$, in which k is 0, are also very particularly simple to obtain. In this case, $A^{1B}$ is preferably unsubstituted or substituted quinolyl, in particular 8-quinolyl.

The number $n^{1B}$ of the ligands $X^{1B}$ depends on the oxidation state of the transition metal $M^{1B}$. The number $n^{1B}$ can thus not be given in general terms. The oxidation state of the transition metals $M^{1B}$ in catalytically active complexes are usually known to those skilled in the art. Chromium, molybdenum and tungsten are very probably present in the oxidation state +3. However, it is also possible to use complexes whose oxidation state does not correspond to that of the active catalyst. Such complexes can then be appropriately reduced or oxidized by means of suitable activators. Preference is given to using chromium complexes in the oxidation state +3.

The transition metal complex of the formula I can be in the form of a monomeric, dimeric or trimeric compound, with I then being 1, 2 or 3. It is possible, for example, for one or more ligands X to bridge two metal centers $M^{1B}$.

Preferred complexes are, for example:
1-(8-quinolyl)-2-methyl-4-methylcyclopentadienylchromium(III) dichloride,
1-(8-quinolyl)-3-isopropyl-5-methylcyclopentadienylchromium(III) dichloride,
1-(8-quinolyl)-3-tert-butyl-5-methylcyclopentadienylchromium(III) dichloride,
1-(8-quinolyl)-2,3,4,5-tetramethylcyclopentadienylchromium(III) dichloride,
1-(8-quinolyl)tetrahydroindenylchromium(III) dichloride,
1-(8-quinolyl)indenylchromium(III) dichloride,
1-(8-quinolyl)-2-methylindenylchromium(III) dichloride,
1-(8-quinolyl)-2-isopropylindenylchromium(III) dichloride,
1-(8-quinolyl)-2-ethylindenylchromium(III) dichloride,
1-(8-quinolyl)-2-tert-butylindenylchromium(III) dichloride,
1-(8-quinolyl)benzindenylchromium(III) dichloride,
1-(8-quinolyl)-2-methylbenzindenylchromium(III) dichloride,
1-(8-(2-methylquinolyl))-2-methyl-4-methylcyclopentadienylchromium(III) dichloride,
1-(8-(2-methylquinolyl))-2,3,4,5-tetramethylcyclopentadienylchromium(III) dichloride,
1-(8-(2-methylquinolyl))tetrahydroindenylchromium(III) dichloride,
1-(8-(2-methylquinolyl))indenylchromium(III) dichloride,
1-(8-(2-methylquinolyl))-2-methylindenylchromium(II) dichloride,
1-(8-(2-methylquinolyl))-2-isopropylindenylchromium(III) dichloride,
1-(8-(2-methylquinolyl))-2-ethylindenylchromium(II) dichloride,
1-(8-(2-methylquinolyl))-2-tert-butylindenylchromium(III) dichloride,
1-(8-(2-methylquinolyl))benzindenylchromium(III) dichloride or
1-(8-(2-methylquinolyl))-2-methylbenzindenylchromium (III) dichloride.

The preparation of functional cyclopentadienyl ligands has been known for a long time. Various synthetic routes to these complexing ligands are described, for example, by M. Enders et. al. in Chem. Ber. (1996), 129, 459–463 or P. Jutzi and U. Siemeling in J. Orgmet. Chem. (1995), 500, 175–185.

The metal complexes, in particular the chromium complexes, can be obtained in a simple manner by reacting the corresponding metal salts, e.g. metal chlorides, with the ligand anion (e.g. using a method similar to the examples in DE-A 197 10615).

Further transition metal compounds B) which are suitable for the purposes of the present invention are imidochromium compounds of the formula (III),

where the variables have the following meanings:
$R^C$ are $R^{1C}$C=NR$^{2C}$, $R^{1C}$C=O, $R^{1C}$C=O(OR$^{2C}$), $R^{1C}$C=S, (R$^{1C}$)$_2$P=O, (OR$^{1C}$)$_2$P=O, SO$_2$R$^{1C}$, $R^{1C}$R$^{2C}$C=N, NR$^{1C}$R$^{2C}$ or BR$^{1C}$R$^{2C}$, C$_1$–C$_{20}$-alkyl, C$_1$–C$_{20}$-cycloalkyl, C$_2$–C$_{20}$-alkenyl, C$_6$–C$_{20}$-aryl, alkylaryl having from 1 to 10 carbon atoms in the alkyl part and 6–20 carbon atoms in the aryl part, hydrogen it this is bound to a carbon atom, with the organic radicals $R^{1C}$ and $R^{2C}$ also being able to bear inert substituents,
$X^{1C}$ are each, independently of one another, fluorine, chlorine, bromine, iodine, NR$^{3C}$R$^{4C}$, NP(R$^{3C}$)$_3$, OR$^{3C}$, OSi (R$^{3C}$)$_3$, SO$_3$R$^{3C}$, OC(O)R$^{3C}$, β-diketonate, BF$_4^-$, PF$_6^-$ or a bulky weakly coordinating or noncoordinating anion, $R^{1C}$–$R^{4C}$ are each, independently of one another, $C_1$–$C_{20}$-alkyl, $C_2$–$C_{20}$-alkenyl, $C_6$–$C_{20}$-aryl, alkylaryl having from 1 to 10 carbon atoms in the alkyl part and 6–20 carbon atoms in the aryl part, hydrogen if this is bound to a carbon atom, with the organic radicals $R^{1C}$ to $R^{4C}$ also being able to bear inert substituents, $n^{1C}$ is 1 or 2, $m^{1C}$ is 1, 2 or 3 and has a value, depending on the valence of Cr, for which the metallocene complex of the formula (II) is uncharged, $L^{1C}$ is an uncharged donor and y is from 0 to 3.

Such compounds and their preparation are described, for example, in WO 01/09148.

Further suitable organic transition metal compounds B) are transition metal complexes with a tridentate macrocyclic ligand.

In particular, suitable organic transition metal compounds B) also include compounds of the formula (IV)

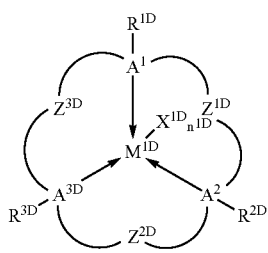

(IV)

where the variables have the following meanings:

$M^{1D}$ is a transition metal of groups 3–12 of the Periodic Table, $Z^{1D}$–$Z^{3D}$ are each a diradical selected from the following group

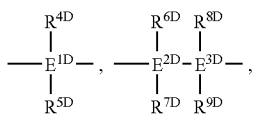

where $E^{1D}$–$E^{3D}$ are each silicon or carbon, $A^{1D}$–$A^{3D}$ are each nitrogen or phosphorus, $R^{1D}$–$R^{9D}$ are each hydrogen, $C_1$–$C_{20}$-alkyl, 5- to 7-membered cycloalkyl which may in turn bear a $C_6$–$C_{10}$-aryl group as substituent, $C_2$–$C_{20}$-alkenyl, $C_6$–$C_{20}$-aryl, alkylaryl having from 1 to 10 carbon atoms in the alkyl part and 6–20 carbon atoms in the aryl part, $SiR^{10D}_3$, where the organic radicals $R^{1D}$–$R^{9D}$ may be substituted by halogen(s) and further functional groups which preferably bear elements of group 15 and/or 16 of the Periodic Table of the Elements and two geminal or vicinal radicals $R^{1D}$–$R^{9D}$ may also be joined to form a five- or six-membered ring, $X^{1D}$ are each, independently of one another, fluorine, chlorine, bromine, iodine, hydrogen, $C_1$–$C_{10}$-alkyl, $C_2$–$C_{10}$-alkenyl, $C_6$–$C_{20}$-aryl, alkylaryl having 1–10 carbon atoms in the alkyl part and 6–20 carbon atoms in the aryl part, $NR^{10D}_2$, $OR^{10D}$, $SR^{10D}$, $SO_3R^{10D}$, $OC(O)R^{10D}$, CN, SCN, =O, β-diketonate, $BF_4^-$, $PF_6^-$ or a bulky noncoordinating anion, $R^{10D}$ are each, independently of one another, hydrogen, $C_1$–$C_{20}$-alkyl, 5- to 7-membered cycloalkyl which may in turn bear a $C_6$–$C_{10}$ aryl group as substituent, $C_2$–$C_{20}$-alkenyl, $C_6$–$C_{20}$-aryl, alkylaryl having from 1 to 10 carbon atoms in the alkyl part and 6–20 carbon atoms in the aryl part and two radicals $R^{10D}$ may also be joined to form a five- or six-membered ring and $n^{1D}$ is a number from 1 to 4 for which the metallocene complex of the formula (IV) is uncharged.

Preferred organic transition metal compounds of the formula (IV) are:

[1,3,5-tri(methyl)-1,3,5-triazacyclohexane]chromium trichloride,

[1,3,5-tri(ethyl)-1,3,5-triazacyclohexane]chromium trichloride,

[1,3,5-tri(octyl)-1,3,5-triazacyclohexane]chromium trichloride,

[1,3,5-tri(dodecyl)-1,3,5-triazacyclohexane]chromium trichloride and

[1,3,5-tri(benzyl)-1,3,5-triazacyclohexane]chromium trichloride.

It is also possible to use mixtures of various organic transition metal compounds as component B).

The catalyst solid preferably further comprises at least one cation-forming compound as component C).

Suitable cation-forming compounds C) which are capable of reacting with the organic transition metal compound B) to convert it into a cationic compound are, for example, compounds such as an aluminoxane, a strong uncharged Lewis acid, an ionic compound having a Lewis-acid cation or an ionic compound containing a Brönsted acid as cation. In the case of metallocene complexes as organic transition metal compound B), the cation-forming compounds C) are frequently also referred to as metallocene ion-forming compounds.

As aluminoxanes, it is possible to use, for example, the compounds described in WO 00/31090. Particularly useful aluminoxanes are open-chain or cyclic aluminoxane compounds of the formula (V) or (VI)

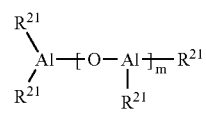

(V)

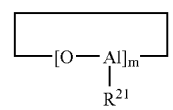

(VI)

where $R^{21}$ is a $C_1$–$C_4$-alkyl group, preferably a methyl or ethyl group, and m is an integer from 5 to 30, preferably from 10 to 25.

These oligomeric aluminoxane compounds are usually prepared by reaction of a solution of trialkylaluminum with water. In general, the oligomeric aluminoxane compounds obtained in this way are in the form of mixtures of both linear and cyclic chain molecules of various lengths, so that m is to be regarded as a mean. The aluminoxane compounds can also be present in admixture with other metal alkyls, preferably aluminum alkyls.

Furthermore, modified aluminoxanes in which some of the hydrocarbon radicals or hydrogen atoms have been replaced by alkoxy, aryloxy, siloxy or amide radicals can also be used as component C) in place of the aluminoxane compounds of the formula (V) or (VI).

It has been found to be advantageous to use the organic transition metal compound B) and the aluminoxane compounds in such amounts that the atomic ratio of aluminum from the aluminoxane compounds to the transition metal from the organic transition metal compound B) is in the range from 10:1 to 1000:1, preferably from 20:1 to 500:1 and in particular in the range from 30:1 to 400:1.

As strong, uncharged Lewis acids, preference is given to compounds of the formula (VII)

$$M^2X^1X^2X^3 \quad (VII)$$

where

M² is an element of group 13 of the Periodic Table of the Elements, in particular B, Al or Ga, preferably B, X¹, X² and X³ are each hydrogen, $C_1$–$C_{10}$-alkyl, $C_6$–$C_{15}$-aryl, alkylaryl, arylalkyl, haloalkyl or haloaryl each having from 1 to 10 carbon atoms in the alkyl radical and from 6 to 20 carbon atoms in the aryl radical or fluorine, chlorine, bromine or iodine, in particular haloaryls, preferably pentafluorophenyl.

Further examples of strong, uncharged Lewis acids are given in WO 00/31090.

Particular preference is given to compounds of the formula (VII) in which X¹, X² and X³ are identical, preferably tris(pentafluorophenyl)borane.

Strong uncharged Lewis acids suitable as cation-forming compounds C) also include the reaction products of a boronic acid with two equivalents of an aluminum trialkyl or the reaction products of an aluminum trialkyl with two equivalents of an acidic fluorinated, in particular perfluorinated, carbon compound such as pentafluorophenol or bis (pentafluorophenyl)borinic acid.

The suitable ionic compounds having Lewis-acid cations include salt-like compounds of the cation of the formula (VII)

$$[(Y^{a+})Q_1Q_2 \ldots Q_z]^{d+} \quad (VIII)$$

where

Y is an element of groups 1 to 16 of the Periodic Table of the Elements, $Q_1$ to $Q_z$ are singly negatively charged groups such as $C_1$–$C_{28}$-alkyl, $C_6$–$C_{15}$-aryl, alkylaryl, arylalkyl, haloalkyl, haloaryl each having from 6 to 20 carbon atoms in the aryl radical and from 1 to 28 carbon atoms in the alkyl radical, $C_3$–$C_{10}$-cycloalkyl which may bear $C_1$–$C_{10}$-alkyl groups as substituents, halogen, $C_1$–$C_{28}$-alkoxy, $C_6$–$C_{15}$-aryloxy, silyl or mercaptyl groups, a is an integer from 1 to 6 and z is an integer from 0 to 5, d corresponds to the difference a–z, but d is greater than or equal to 1.

Particularly useful cations are carbonium cations, oxonium cations and sulfonium cations and also cationic transition metal complexes. Particular mention may be made of the triphenylmethyl cation, the silver cation and the 1,1'-dimethylferrocenyl cation. They preferably have noncoordinating counterions, in particular boron compounds as are also mentioned in WO 91/09882, preferably tetrakis(pentafluorophenyl)borate.

Salts having noncoordinating anions can also be prepared by combining a boron or aluminum compound, e.g. an aluminum alkyl, with a second compound which can react to link two or more boron or aluminum atoms, e.g. water, and a third compound which forms an ionizing ionic compound with the boron or aluminum compound, e.g. triphenylchloromethane. In addition, a fourth compound which likewise reacts with the boron or aluminum compound, e.g. pentafluorophenol, can be added.

Ionic compounds containing Brönsted acids as cations preferably likewise have noncoordinating counterions. As Brönsted acid, particular preference is given to protonated amine or aniline derivatives. Preferred cations are N,N-dimethylanilinium, N,N-dimethylcyclohexylammonium and N,N-dimethylbenzylammonium and also derivatives of the latter two.

Preferred ionic compounds C) are, in particular, N,N-dimethylanilinium tetrakis(pentafluoro-phenyl)borate, N,N-dimethylcyclohexylammonium tetrakis(pentafluorophenyl) borate and N,N-dimethylbenzylammonium tetrakis (pentafluorophenyl)borate.

It is also possible for two or more borate anions to be joined to one another, as in the dianion [$(C_6F_5)_2$B—$C_6F_4$—B$(C_6F_5)_2$]²⁻, or the borate anion can be bound via a bridge to a suitable fuctional group on the support surface.

Further suitable cation-forming compounds C) are listed in WO 00/31090.

The amount of strong, uncharged Lewis acids, ionic compounds having Lewis-acid cations or ionic compounds containing Brönsted acids as cations is preferably from 0.1 to 20 equivalents, preferably from 1 to 10 equivalents, based on the organic transition metal compound B).

Suitable cation-forming compounds C) also include boron-aluminum compounds such as di[bis-(pentafluorophenyl)boroxy]methylalane. Examples of such boron-aluminum compounds are those disclosed in WO 99/06414.

It is also possible to use mixtures of all the abovementioned cation-forming compounds C). Preferred mixtures comprise aluminoxanes, in particular methylaluminoxane, and an ionic compound, in particular one containing the tetrakis(pentafluorophenyl)borate anion, and/or a strong uncharged Lewis acid, in particular tris(pentafluorophenyl) borane.

Both the organic transition metal compound B) and the cation-forming compounds C) are preferably used in a solvent, preferably an aromatic hydrocarbon having from 6 to 20 carbon atoms, in particular xylenes or toluene.

The catalyst solid can further comprise, as additional component D), a metal compound of the formula (IX), $$M^3(R^{22})_r(R^{23})_s(R^{24})_t \quad (IX)$$

where

M³ is an alkali metal, an alkaline earth metal or a metal of group 13 of the Periodic Table, i.e. boron, aluminum, gallium, indium or thallium, R²² is hydrogen, $C_1$–$C_{10}$-alkyl, $C_6$–$C_{15}$-aryl, alkylaryl or arylalkyl each having from 1 to 10 carbon atoms in the alkyl part and frog 6 to 20 carbon atoms in the aryl part, R²³ and R²⁴ are each hydrogen, halogen, $C_1$–$C_{10}$-alkyl, $C_6$–$C_{15}$-aryl, alkylaryl, arylalkyl or alkoxy each having from 1 to 10 carbon atoms in the alkyl radical and from 6 to 20 carbon atoms in the aryl radical, r is an integer from 1 to 3, and s and t are integers from 0 to 2, with the sum r+s+t corresponding to the valence of M³, where the component D) is not identical to the component C). It is also possible to use mixtures of various metal compounds of the formula (IX).

Among the metal compounds of the formula (IX), preference is given to those in which $M^3$ is lithium, magnesium or aluminum and $R^{23}$ and $R^{24}$ are each $C_1$–$C_{10}$-alkyl.

Particularly preferred metal compounds of the formula (IX) are n-butyllithium, n-butyl-n-octyl-magnesium, n-butyl-n-heptylmagnesium, tri-n-hexylaluminum, triisobutylaluminum, triethylaluminum and trimethylaluminum and mixtures thereof.

When a metal compound D) is used, it is preferably present in the catalyst solid in such an amount that the molar ratio of $M^3$ from formula (IX) to transition metal M from organic transition metal compound B) is from 800:1 to 1:1, in particular from 200:1 to 2:1.

In general, the catalyst solid together with the further metal compound D') of the formula (IX), which may be different from the metal compound(s) D) used in the preparation of the catalyst solid, is used as constituent of a catalyst system for the polymerization or copolymerization of olefins. It is also possible, particularly when the catalyst solid does not contain any component C), for the catalyst system to further comprise, in addition to the catalyst solid, one or more cation-forming compounds which are identical to or different from any cation-forming compounds present in the catalyst solid.

The catalyst solids of the present invention are in principle prepared by immobilizing at least one of the components B) or C) on the support by physisorption or by means of chemical reaction, i.e. covalent binding of the components, with reactive groups of the support surface. The order in which the support component, the component B) and any component C) are combined is immaterial. The components B) and C) can be added independently of one another or simultaneously. After the individual process steps, the solid can be washed with suitable inert solvents such as aliphatic or aromatic hydrocarbons.

In a preferred embodiment, the organic transition metal compound B) is brought into contact with the cation-forming compound C) in a suitable solvent, usually giving a soluble reaction product, an adduct or a mixture. The preparation obtained in this way is then brought into contact with the calcined hydrotalcite A), which may have been pretreated, and the solvent is completely or partly removed. This preferably gives the catalyst solid in the form of a free-flowing powder. Examples of the industrial implementation of the above process are described in WO 96/00243, WO 98/40419 or WO 00/05277. A further preferred embodiment comprises firstly applying the cation-forming compound C) to the calcined hydrotalcite A) and subsequently bringing this supported cation-forming compound into contact with the organic transition metal compound B).

It is also possible for the catalyst solid firstly to be prepolymerized with α-olefins, preferably linear $C_2$–$C_{10-1}$-alkenes and in particular ethylene or propylene, and the resulting prepolymerized catalyst solid then to be used in the actual polymerization. The mass ratio of catalyst solid used in the prepolymerization to monomer polymerized onto it is usually in the range from 1:0.1 to 1:200.

Furthermore, a small amount of an olefin, preferably an α-olefin, for example vinylcyclohexane, styrene or phenyldimethylvinylsilane, as modifying component, an antistatic or a suitable inert compound such as a wax or oil can be added as additive during or after the preparation of the supported catalyst system. The molar ratio of additives to transition metal compound B) is usually from 1:1000 to 1000:1, preferably from 1:5 to 20:1.

The polymerization can be carried out in a known manner in bulk, in suspension, in the gas phase or in a supercritical medium in the customary reactors used for the polymerization of olefins. It can be carried out batchwise or preferably continuously in one or more stages. Solution processes, suspension processes, stirred gas-phase processes or gas-phase fluidized-bed processes are all possible. As solvents or suspension media, it is possible to use inert hydrocarbons, for example isobutane, or else the monomers themselves.

The polymerization can be carried out at from –60 to 300° C. under pressure in the range from 0.5 to 3000 bar. Preference is given to temperatures in the range from 50 to 200° C., in particular from 60 to 100° C., and pressures in the range from 5 to 100 bar, in particular from 15 to 70 bar. The mean residence times are usually from 0.5 to 5 hours, preferably from 0.5 to 3 hours. Molar mass regulators, for example hydrogen, or customary additives such as antistatics can also be used in the polymerization.

The catalyst solids of the present invention give a very high productivity in the polymerization of olefins, offer advantages in the work-up of the polymers after the polymerization and lead to significantly fewer problems in respect of catalyst residues in the polymer. The polymers prepared using the catalyst system of the present invention are particularly useful for applications which require a high product purity.

EXAMPLES

To characterize the samples, the following tests were carried out:

Determination of the magnesium and aluminum contents:
  The magnesium and aluminum contents were determined on the samples digested in a mixture of concentrated nitric acid, phosphoric acid and sulfuric acid using an inductively coupled plasma atom emission spectrometer (ICP-AES) from Spectro, Kleve, Germany, with the measurements being carried out using the spectral lines at 277.982 nm for magnesium and at 309.271 nm for aluminum.

Determination of the specific surface area:
  By nitrogen adsorption in accordance with DIN 66131

Determination of the pore volume:
  By mercury porosymmetry in accordance with DIN 66133

Determination of $d_{10}$, $d_{50}$ and $d_{90}$:
  The particle size distribution of the particles was measured in a dispersion in isopropanol by laser light scattering using a Mastersizer X from Malvern, Great Britain. The parameters $d_{10}$, $d_{50}$ and $d_{90}$ are the volume-based percentiles of the diameter. $d_{50}$ is at the same time the median of the particle size distribution.

Determination of the loss on ignition:
  The loss on ignition is the weight loss experienced by a sample which is heated in two steps, firstly for 30 minutes at 200° C. in a drying oven and then for 1 hour at 950° C. in a muffle furnace.

X-ray diffractometry:
  The X-ray diffraction patterns were measured by means of a powder diffractometer D 5000 from Siemens using Cu—$K_\alpha$ radiation.

Determination of the OH number:
  About 20 g of the solid to be examined are suspended in 250 ml of heptane and the suspension is cooled to 0° C. while stirring. At constant temperature, 40 ml of a 2 M solution of triethylaluminum in heptane are added continuously over a period of 30 minutes. The ethane formed is collected and its volume is determined. The OH number is the molar amount of ethane formed divided by the mass of support used.

Determination of the residual moisture content:

The residual moisture content is the content of volatiles given by a measurement under an inert gas atmosphere using a Mettler LJ 16 Moisture Analyser from Mettler-Toledo, Greifensee, Switzerland.

Determination of the pressure rise during melt filtration:

The pressure rise during melt filtration was determined by extrusion of the polypropylene through a metal filter disk having a support mesh having a mesh opening of 5 mm at 265° C. and a throughput of 2 kg/h on a standard laboratory extruder (3-zone screw). The pressure rise was recorded as a function of time for 1 hour at a constant polypropylene throughput.

Determination of the particle size distribution of the polypropylene powder:

The particle size distribution of the polypropylene powder was determined by sieve analysis.

Determination of the melt flow rate (MFR):

in accordance with ISO standard 1133, at 230° C. under a weight of 2.16 kg.

Determination of the melting point:

The melting point $T_m$ was determined by DSC measurement in accordance with ISO standard 3146 using a first heating at a heating rate of 20° C. per minute up to 200° C., a dynamic crystallization at a cooling rate of 20° C. per minute down to 25° C. and a second heating at a heating rate of 20° C. per minute back up to 200° C. The melting point is then the temperature at which the curve of enthalpy versus temperature measured during the second heating displays a maximum.

Determination of the width of the molar mass distribution (Q value):

Gel permeation chromatography (GPC) was carried out at 145° C. in 1,2,4-trichlorobenzene using a GPC apparatus 150 C from Waters. The data were evaluated using the software Win-GPC from HS-Entwicklungsgesellschaft für wissenschaftliche Hard- and Software mbH, Ober-Hilbersheim. The columns were calibrated by means of polypropylene standards having molar masses from 100 to $10^7$ g/mol.

The mass average ($M_w$) and number average ($M_n$) of the molar masses of the polymers were determined. The Q value is the ratio of mass average ($M_w$) to number average ($M_n$).

Determination of the proportion of xylene-soluble material:

To determine the proportion of xylene-soluble material, 5 g of propylene polymer were introduced into 500 ml of distilled xylene (isomer mixture) which had been heated to 100° C. beforehand. The mixture was subsequently heated to the boiling point of xylene and maintained at this temperature for 60 minutes. It was then cooled to 5° C. over a period of 20 minutes in a cold bath and then warmed to 20° C. again. This temperature was maintained for 30 minutes. The polymer which had precipitated was filtered off. Precisely 100 ml of the filtrate were taken and the solvent was removed on a rotary evaporator. The residue which remained was dried for 2 hours at 80° C./250 mbar and weighed after cooling.

The proportion of xylene-soluble material was then calculated according to the formula $$X_S = \frac{g \times 500 \times 100}{G \times V}$$

where
$X_s$=proportion of xylene-soluble material in %,
g=amount found in g,
G=amount of product used in g and
V=volume of the amount of filtrate used in ml.

Example 1 a) Pretreatment of the Support

The support material used was Puralox MG 61 from Condea Chemie GmbH. This is aluminum-magnesium mixed oxide which has an MgO content of 61% by weight, a specific surface area of 156 m$^2$/g, a pore volume of 1.4 ml/g and a particle size distribution characterized by a $d_{10}/d_{50}/d_{90}$ ratio of 21.1/44.0/71.0 μm and has been calcined at 550° C. for 3 hours in a rotary tube furnace. A loss on ignition of 11.6% by weight was determined on the starting material. FIG. 1 shows an X-ray diffraction pattern of the aluminum-magnesium mixed oxide.

100 g of Puralox MG 61 were firstly dried for 30 hours at 180° C. and 1 mbar and subsequently stored in a nitrogen atmosphere. This reduced the loss on ignition to 7.1% by weight.

b) Loading with Metallocene/MAO 153.2 mg (206.7 μmol) of rac-dimethylsilanediylbis(2-methyl-4-(para-tert-butylphenyl)indenyl)-zirconium dichloride, whose content of meso isomer was below the NMR-spectroscopic detection limit of 5%, were dissolved at room temperature in 9.1 ml of a 4.75 M solution of MAO in toluene from Albemarle (corresponding to 43.3 mmol of Al). The solution was diluted with 7.2 ml of toluene and stirred at 25° C. for 1 hour in the absence of light. This solution was added a little at a time while stirring to 10.05 g of the calcined aluminum-magnesium mixed oxide which had been pretreated in Example 1a) and the mixture was stirred for 10 minutes after the addition was complete. The material was subsequently dried at 40° C. and 10$^{-3}$ mbar for 4 hours.

This gave 12.64 g of a free-flowing, pink powder (residual moisture content: 2.0% by weight).

c) Polymerization

A dry 16 l reactor which had been flushed firstly with nitrogen and subsequently with propylene was charged with 10 l of liquid propene. In addition, 5 standard dm$^3$ of hydrogen were metered in. Furthermore, 8 ml of a 20% strength by weight solution of triethylaluminum in a high-boiling dearomatized hydrocarbon mixture from Witco were added and the mixture was stirred at 30° C. for 15 minutes. A suspension of 600 mg of the catalyst solid prepared in Example 1b) in 20 ml of a high-boiling dearomatized hydrocarbon mixture was subsequently introduced into the reactor, the reaction mixture was heated to the polymerization temperature of 65° C. and maintained at this temperature for 1 hour. The polymerization was stopped by venting the monomers and the polymer obtained was dried under reduced pressure. This gave a yield of 2930 g of polypropylene, corresponding to a productivity of 4890 g of polypropylene/g of catalyst solid.

100 g of the polymer powder were fractionated by means of a Haver EML 200 digital T analytical sieving machine from Haver & Boecker, Oelde, Germany. 10 mg were isolated below the sieve having a mesh opening of 100 μm, melted on a hot stage and examined under an optical microscope. An average of 5 unmelted particles having a diameter of from 5 to 20 μm were found on an area of 300 μm×1000 μm.

Comparative Example A a) Deactivation of the Support

The support material used was Sylopol 948, a silica gel from Grace. The silica gel was calcined at 700° C. for 8 hours.

b) Loading with Metallocene/MAO

Example 1b) was repeated, except that 154.7 mg (208.8 μmol) of the metallocene which had been dissolved in 9.3 ml of the 4.75 M MAO solution (corresponding to 43.8 mmol of Al) and diluted with 11.1 ml of toluene were combined with 10.14 g of the support material from Comparative Example Aa).

c) Polymerization

Example 1c) was repeated, except that 900 mg of the catalyst solid prepared in Comparative Example Ab) were used. This gave 2780 g of polypropylene, corresponding to a productivity of 3090 g of polypropylene/g of catalyst solid.

100 g of the polymer powder were sieved and examined as in Example 1c). An average of 20 unmelted particles having a diameter of from 5 to 50 μm were found on an area of 300 μm×1000 μm.

Example 2 a) Pretreatment of the Support 5000 of Puralox MG 61 were dried at 300° C. for 12 hours in a stream of nitrogen and subsequently stored under a nitrogen atmosphere. The loss on ignition was then 7.5% by weight.

b) Loading with Metallocene/MAO 3000 g of the Puralox MG 61 having a $d_{50}$=44 μm and a pore volume of 1.4 ml/g which had been pretreated in Example 2a) were placed under nitrogen in a conical screw dryer (capacity=60 I). In parallel thereto, 40 g of rac-dimethylsilanediylbis(2-methylindenyl)zirconium dichloride were dissolved in 3000 g of a 4.75 M solution of MAO in toluene from Albemarle at room temperature. The solution was subsequently diluted with 2024 ml of toluene to a total volume of 5250 ml. The ratio of total volume of the solution to the pore volume of the support material was 1.25.

The metallocene-MAO solution which had been prepared in this way was sprayed at room temperature via a nozzle onto the support material while stirring at the same time (metering rate: 5 l/h). After the addition was complete, the material was stirred for another 20 minutes and the solvent was subsequently removed under reduced pressure at a wall temperature of 50° C.

This gave 4150 g of a free-flowing, pink powder.

The loading of the support material was 0.01 g of metallocene/g of support and 0.3 g of MAO/g of support.

The catalyst had a residual moisture content of 5.3% by weight.

c) Polymerization

The supported metallocene catalyst prepared in Example 2b) was used for a continuous propylene homopolymerization in a vertically mixed 800 gas-phase reactor. The reactor contained a bed of finely divided polypropylene powder and was operated at a constant output of about 100 kg/h. The reactor pressure was 24 bar and the reactor temperature was 63° C. 300 mmol/h of triisobutylaluminum were introduced as a 1 M solution in heptane. This gave a polymer powder having a bulk density of 490 g/l, a mean particle size of 895 μm and with 2.3% by weight of particles having a diameter of >2 mm. The catalyst productivity was 8300 g of PP/g of catalyst solid.

The melt filtration test using the polypropylene obtained gave a pressure rise of 8 bar/kg of polypropylene.

Comparative Example B a) Pretreatment of the Support

The support material used was Sylopol 948, a silica gel from Grace having a $d_{50}$=50 μm, a pore volume of 1.6 ml/g and a loss on ignition of 8.4% by weight. The silica gel was dried at 300° C. for 12 hours in a stream of nitrogen. The treatment reduced the loss on ignition to 3.0% by weight.

b) Loading with Metallocene/MAO

Example 2b) was repeated, except that the metallocene-MAO solution was diluted with 2774 ml of toluene to a total volume of 6000 ml prior to spraying onto the support material which had been pretreated in Comparative Example Ba). The ratio of the total volume of the solution to the pore volume of the support material was 1.25.

This gave 4140 g of a free-flowing, pink powder.

The loading of the support material was 0.01 g of metallocene/g of support and 0.3 g of MAO/g of support.

The catalyst had a residual moisture content of 5.0% by weight.

c) Polymerization

Example 2c) was repeated, except that the catalyst solid prepared in Comparative Example Bb) was used. This gave a polymer powder having a bulk density of 470 g/l, a mean particle size of 930 μm and with 2.8% by weight of particles having a diameter of >2 mm. The catalyst productivity was 6100 g of PP/g of catalyst solid.

The melt filtration test using the polypropylene obtained gave a pressure rise of 120 bar/kg of polypropylene.

Example 3 a) Pretreatment of the Support 20 g of Puralox MG 61 from Condea Chemie GmbH were dried at 180° C. and 1 mbar for 8 hours, suspended in 100 ml of toluene (abs.) and admixed with 17.6 ml of a 4.75 M solution of MAO in toluene from Albemarle (corresponding to 79.3 mmol of Al) over a period of 30 minutes while stirring. After the addition was complete, the suspension was stirred at room temperature for 3 hours and subsequently filtered. The filter cake was dried in a stream of nitrogen until it was free-flowing.

Yield: 44.3 g b) Loading with Metallocene/MAO 280 mg of dimethylsilanediylbis(2-methyl-4,5-benzindenyl)zirconium dichloride (0.48 mmol) were mixed with 4 ml of a 4.75 M solution of MAO in toluene (19.0 mmol) from Albemarle and with 33.2 ml of toluene (abs.) and stirred at room temperature for one hour. 17.7 g of the deactivated support from Example 3a) (corresponding to 8 g of Puralox MG 61) were placed as a column having a quite smooth surface on a frit and covered with the metallocene/MAO solution. The solution was allowed to run through the column without any applied pressure differential until the liquid surface coincided with the surface of the column. The moist filter cake was stirred with a spatula and allowed to stand at room temperature for 3 hours. The remaining solution was then pushed through under a pressure differential and the catalyst was dried in a stream of nitrogen until it was free-flowing.

Yield: 11.5 g of orange powder (residual moisture content=3.5% by weight)

c) Polymerization

A mixture of 18 mmol of triisobutylaluminum (9 ml of 2 M solution in heptane) and 2 mmol of diisobutylaluminum hydride (1 ml of 2 M solution in heptane) was placed in a dry 10 l autoclave which contained 100 g of polymer powder and had been flushed with nitrogen. 408 mg of the catalyst solid prepared in Example 3b) were introduced in a countercurrent of nitrogen via the inlet port and the autoclave was charged with 7 l of liquid propene. The autoclave was subsequently heated to 65° C. and the polymerization was carried out at this temperature. After 90 minutes, the polymerization was stopped by venting the remaining propene and the product was discharged through the bottom valve.

This gave 1980 g of polypropylene powder having a good morphology. The particle size distribution of the powder was:

| <0.1 mm | 0.1% by weight |
|---|---|
| >0.1 mm–<0.2 mm | 0.5% by weight |
| >0.2 mm–<0.3 mm | 3.7% by weight |
| >0.3 mm–<0.5 mm | 43.6% by weight |
| >0.5 mm–<1.0 mm | 50.7% by weight |
| >1.0 mm–<2.0 mm | 1.5% by weight |

The productivity was 5030 g of PP/g of catalyst solid.

The polypropylene obtained had a melt flow rate (MFR) of 6.5 g/l 10 min, a melting point $T_T$ of 146.1° C., a Q value of 2.0 and a proportion of xylene-soluble material of 0.2% by weight.

Comparative Example C a) Pretreatment of the Support 30 g of Sylopol 948, a silica gel from Grace, were dried at 180° C. and 1 mbar for 8 hours, suspended in 150 ml of toluene (abs.) and admixed with 26.4 ml of a 4.75 M solution of MAO in toluene (124 mmol) from Albemarle over a period of 30 minutes while stirring. After the addition was complete, the suspension was stirred at room temperature for 3 hours and subsequently filtered. The filter cake was dried in a stream of nitrogen until it was free-flowing.

Yield: 68.4 g b) Loading with Metallocene/MAO

Example 3b) was repeated, except that 18.2 g (corresponding to 8 g of Sylopol 948) of the deactivated support material prepared in Comparative Example Ca) were used.

Yield: 13.8 g of orange powder
(Residual moisture content=16.9% by weight)

c) Polymerization

Example 3c) was repeated, except that 379 mg of the catalyst solid prepared in Comparative Example Cb) were used.

This gave 830 g of polypropylene powder having a good morphology. The particle size distribution of the polypropylene powder was:

| <0.1 mm | 0.2% by weight |
|---|---|
| >0.1 mm–<0.2 mm | 0.4% by weight |
| >0.2 mm–<0.3 mm | 2.3% by weight |
| >0.3 mm–<0.5 mm | 17.0% by weight |
| >0.5 mm–<1.0 mm | 73.8% by weight |
| >1.0 mm–<2.0 mm | 6.3% by weight |

The productivity was 2640 g of PP/g of catalyst solid.

The polypropylene obtained had a melt flow rate (MFR) of 6.2 g/10 min, a melting point $T_m$ of 144.8° C., a Q value of 1.7 and a proportion of xylene-soluble material of 0.2% by weight.

Example 4 a) Pretreatment of the Support 100 g of Puralox MG 61 from Condea Chemie GmbH were heated at 150° C. for 6 hours. The support subsequently had an OH number of 0.19 mmol/g of support.

b) Loading with Metallocene/MAO 287.1 mg of (nBu-Cp)$_2$ZrCl$_2$ (Witco, Eurecen 5031) were suspended in 4.1 ml of toluene, admixed with 18.6 ml of a 4.75 M solution of MAO in toluene from Albemarle and stirred for 45 minutes. The metallocene/MAO solution was added over a period of 10 minutes to 14.2 g of the deactivated support from Example 4a) and the mixture was stirred for another 60 minutes. The catalyst was then dried at room temperature and $10^{-3}$ mbar. This gave 20.2 g of a pale yellow-beige solid.

c) Polymerization 400 ml of isobutane and 3 ml of a 20% strength by weight solution of butyloctylmagnesium in heptane (corresponding to 150 mg of butyloctylmagnesium) were placed in a 1 l autoclave which had been made inert by means of argon, and 24.0 mg of the catalyst solid obtained in Example 4b) were then introduced. Polymerization was carried out at 70° C. under an ethylene pressure of 40 bar for 90 minutes. The polymerization was stopped by releasing the pressure and the product was discharged via the bottom valve. This gave 400 g of polyethylene.

Productivity: 16,670 g of PE/g of catalyst solid

Comparative Example D a) Pretreatment of the Support 100 g of ES 70 X, a spray-dried silica gel from Crosfield, were heated at 600° C. for 6 hours. The support subsequently had an OH number of 0.15 mmol/g of support.

b) Loading with Metallocene/MAO

Example 4b) was repeated, except that 12.8 g of the deactivated support material prepared in Comparative Example Da), which had approximately the same OH number as the support used in Example 4b), 258.8 mg of the metallocene and 16.7 ml of the 4.75 M MAO solution were used. This gave 18.0 g of a pale yellow-beige solid.

c) Polymerization

Example 4c) was repeated, except that 24.8 mg of the catalyst solid prepared in Comparative Example Db) were used. This gave 300 g of polyethylene.

Productivity: 12,100 g of PE/g of catalyst solid

Example 5

Polymerization

A dry 5 l reactor which had been flushed firstly with nitrogen and subsequently with propylene was charged with 3 l of liquid propene. In addition, 5 standard dm$^3$ of hydrogen were metered in.

Furthermore, 23 ml of a 20% strength by weight solution of triethylaluminum in a high-boiling dearomatized hydrocarbon mixture from Witco were added and the mixture was stirred at 30° C. for 15 minutes. A suspension of 250 mg of the catalyst solid prepared in Example 1b) in 20 ml of a high-boiling dearomatized hydrocarbon mixture was subsequently introduced into the reactor, the reaction mixture was heated to the polymerization temperature of 65° C. and maintained at this temperature for 1 hour. The polymerization was stopped by venting the monomers and the polymer obtained was dried under reduced pressure. This gave a yield of 887 g of polypropylene, corresponding to a productivity of 4890 g of polypropylene/g of catalyst solid. The polypropylene obtained had a melting point $T_m$ of 151.7° C., a mean molar mass $M_w$ of 493,000 g/mol and a Q value of 3.0. The content of atactic polypropylene was 0.11%. No deposits were found in the reactor.

Example 6 a) Pretreatment of the Support

Figure 2:
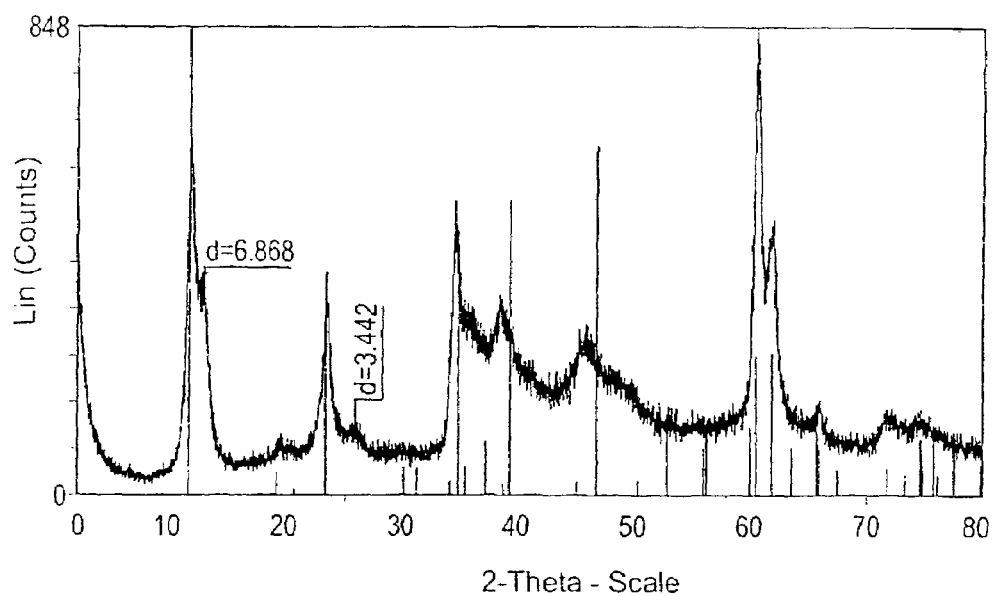
FIG. 2 shows an X-ray diffraction pattern of a magnesium aluminum mixed oxide calcined at 250° C. for 3 hours

The support material used was an aluminum-magnesium mixed oxide obtained from the same starting material as the aluminum-magnesium mixed oxide of Example 1a). The calcination was likewise carried out as in Example 1a), but at 250° C. for 3 hours. The calcined aluminum-magnesium mixed oxide obtained had a specific surface area of 81 m$^2$/g and a pore volume of 1.14 ml/g. The loss on ignition was 38.1% by weight. Fractionation of the calcined aluminum-magnesium mixed oxide by means of a stack of sieves gave the following particle size distribution: <25 µm 28% by weight, <45 µm 47.8% by weight and <90 µm 88.4% by weight. FIG. 2 shows an X-ray diffraction pattern of the partially calcined aluminum-magnesium mixed oxide.

100 g of the aluminum-magnesium mixed oxide were dried as in Example 1a) and subsequently stored under a nitrogen atmosphere. This reduced the loss on ignition to 33.6% by weight.

b) Loading with Metallocene/MAO

The loading of the support was carried out as in Example 1b), except that 5.9 ml of toluene were used for dilution.

This gave 12.7 g of a free-flowing, pink powder (residual moisture content: 2.3% by weight).

c) Polymerization

Example 5 was repeated. A productivity of 4.36 kg of polypropylene/g of catalyst solid was obtained.

The polypropylene obtained had a melting point $T_m$ of 151.7° C., a mean molar mass $M_w$ of 507,000 g/mol and a Q value of 4.1. The content of atactic polypropylene was 0.24%. No deposits were found in the reactor.

Example 7

Figure 3:
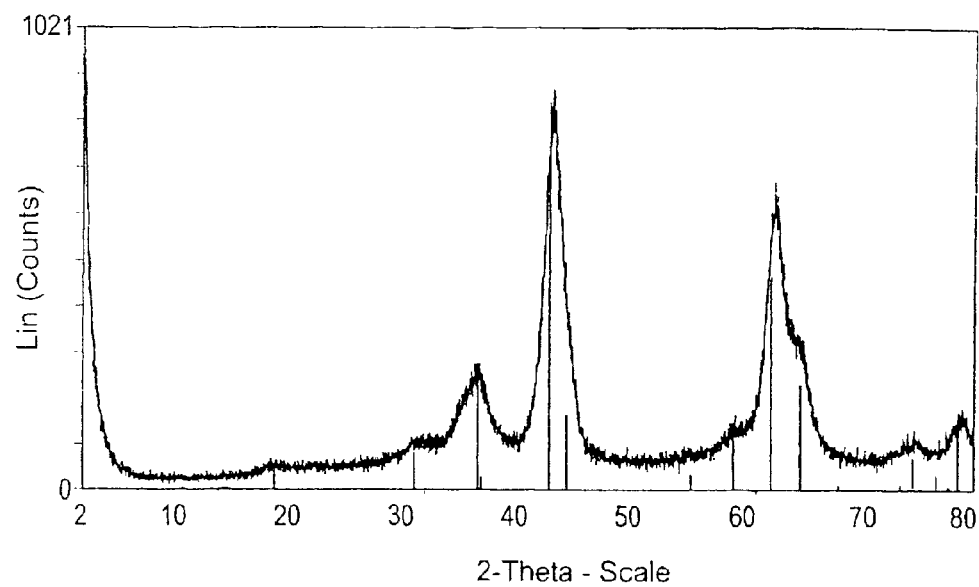
FIG. 3 shows an X-ray diffraction pattern of a magnesium-aluminum mixed oxide calcined at 800° C. for 3 hours

The procedure of Example 6 was repeated, but the aluminum-magnesium mixed oxide was calcined at 800° C. for 3 hours. The aluminum-magnesium mixed oxide had a specific surface area of 138 m$^2$/g and a pore volume of 1.59 ml/g. The loss on ignition was 3.74% by weight. The particle size distribution determined by fractionation by means of a stack of sieves was: <25 µm 27.7% by weight, <45, µm 48.8% by weight and <90 µm 90.3% by weight. FIG. 3 shows an X-ray diffraction pattern of the aluminum-magnesium mixed oxide.

100 g of the aluminum-magnesium mixed oxide were dried as in Example 1a) and subsequently stored under a nitrogen atmosphere. This reduced the loss on ignition to 1.47% by weight.

b) Loading with Metallocene/MAO

The loading of the support was carried out as in Example 1b), except that 14.9 ml of toluene were used for dilution.

This gave 12.5 g of a free-flowing, pink powder (residual moisture content: 0.97% by weight).

c) Polymerization

Example 5 was repeated. A productivity of 4.16 kg of polypropylene/g of catalyst solid was obtained.

The polypropylene obtained had a melting point $T_m$ of 155.1° C, a mean molar mass $M_w$ of 247,000 g/mol and a Q value of 2.9. The content of atactic polypropylene was 0.3%. No deposits were found in the reactor.

Comparative Example E

Figure 4:
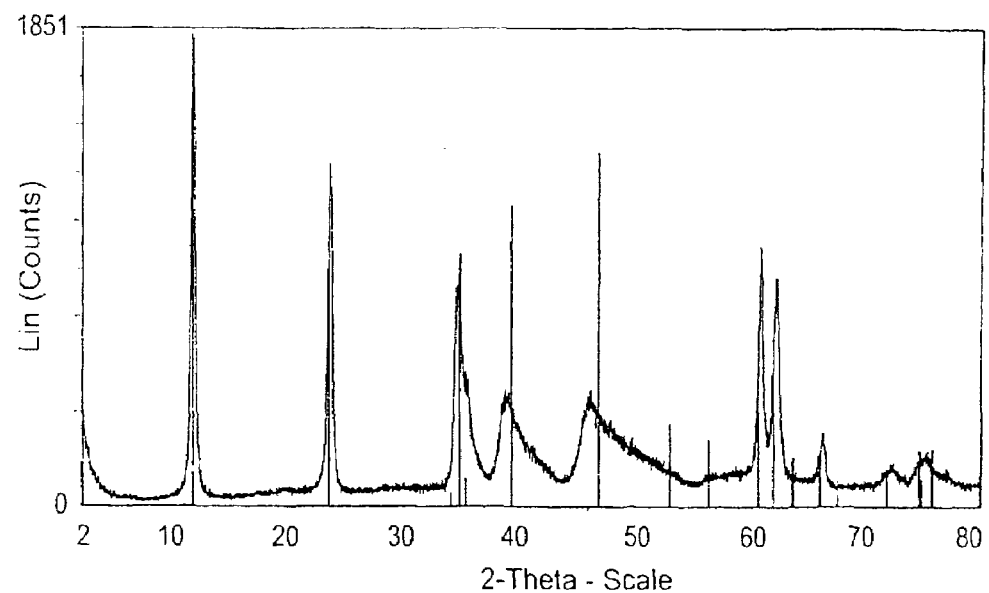
FIG. 4 shows an X-ray diffraction pattern of a conventional uncalcined magnesium aluminum oxide (prior art)

The procedure of Example 6 was repeated, but the uncalcined starting material was used. This had a specific surface area of 236 m$^2$/g and a pore volume of 1.12 ml/g. The loss on ignition was 45.6% by weight. The particle size distribution determined by fractionation by means of a stack of sieves was: <25 µm 53.4% by weight, <45 µm 96.8% by weight and <90 82 m 100% by weight. FIG. 4 shows an X-ray diffraction pattern of the uncalcined starting material.

b) Loading with Metallocene/MAO

The loading of the support was carried out as in Example 1b), except that dilution was carried out using 2.8 ml of toluene and the amount of metallocene used was 154.1 mg.

This gave 12.8 g of a free-flowing, pink powder (residual moisture content: 2.02% by weight).

c) Polymerization

Example 5 was repeated. A productivity of 2.04 kg of polypropylene/g of catalyst solid was obtained.

The polypropylene obtained had a melting point $T_m$ of 152.1° C., a mean molar mass $M_w$ of 285,000 g/mol and a Q value of 4.4. The content of atactic polypropylene was 0.42%. Slight deposit formation was observed in the reactor.

Example 8 a) Pretreatment of the Support 5 g of Puralox MG 61 were dried at 180° C. and 1 mbar for 8 hours and subsequently stored under a nitrogen atmosphere.

b) Loading with Metallocene/MAO 130.3 mg of dichloro[1-(8-quinolyl)-2,3,4,5-tetramethyl-cyclopentadienyl]chromium (350 mmol) were dissolved in 9.2 ml of a 4.75 M solution of MAO in toluene from Albemarle (corresponding to 43.75 mmol of Al) and stirred at room temperature for 15 minutes (Cr:Al=1:125).

This solution was applied while stirring directly to the calcined aluminum-magnesium mixed oxide which had been pretreated in Example 4a) and the mixture was stirred for an hour once addition was completed. The reaction mixture obtained in this way was allowed to stand for 2 hours and subsequently dried at room temperature under reduced pressure. This gave a light-violet powder.

c) Polymerization 400 ml of isobutane and 80 mg of butyllithium (as a 0.1 M solution in heptane) were introduced into a 1 l autoclave which had been made inert with argon, and 342 mg of the catalyst solid obtained in Example 4b) were then introduced. Polymerization was carried out at 70° C. and an ethylene pressure of 40 bar for 60 minutes. The polymerization was stopped by releasing the pressure, the product was discharged via the bottom valve and admixed with methanolic HCl solution (15 ml of concentrated hydrochloric acid in 50 ml of methanol). 250 ml of methanol were subsequently added, the white polymer formed was filtered off, washed with methanol and dried at 70° C. This gave 400 g of polyethylene.

Productivity: 1200 g of PE/g of catalyst solid

What is claimed is:

1. A catalyst solid for olefin polymerization comprising
   A) as a support material at least one hydrotalcite calcined at above 180° C.,
   B) at least one organic transition metal compound, and
   C) at least one cation-forming compound.

2. A catalyst solid as claimed in claim 1, wherein the calcined hydrotalcite is particulate and has a mean particle diameter $d_{50}$ of from 10 to 200 µm.

3. A catalyst solid as claimed in claim 1, wherein an aluminum-magnesium mixed oxide is used as calcined hydrotalcite.

4. A catalyst solid as claimed in claim 1, wherein the cation-forming compound C) is an open-chain or cyclic aluminoxane compound of the formula (V) or (VI)

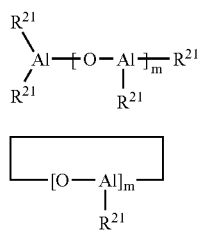

where
$R^{21}$ is a $C_1$–$C_4$-alkyl group and in is an integer from 5 to 30.

5. A catalyst solid as claimed in claim 1 which further comprises, as additional component D), one or more metal compounds of the formula (IX)

$$M^3(R^{22})_r(R^{23})_s(R^{24})_t \qquad (IX)$$

where
$M^3$ is an alkali metal, an alkaline earth metal or a metal of group 13 of the Periodic Table, $R^{22}$ is hydrogen, $C_1$–$C_{10}$-alkyl, $C_6$–$C_{15}$-aryl, alkylaryl or arylalkyl each having from 1 to 10 carbon atoms in the alkyl part and from 6 to 20 carbon atoms in the aryl part, $R^{23}$ and $R^{24}$ are each hydrogen, halogen, $C_1$–$C_{10}$-alkyl, $C_6$–$C_{15}$-aryl, alkylaryl, arylalkyl or alkoxy each having from 1 to 10 carbon atoms in the alkyl radical and from 6 to 20 carbon atoms in the aryl radical, r is an integer from 1 to 3, and s and t are integers from 0 to 2, with the sum r+s+t corresponding to the valence of $M^3$.

6. A prepolymerized catalyst comprising the catalyst solid as claimed in claim 1 and, polymerized onto the catalyst solid, linear $C_2$–$C_{10}$-1-alkenes, wherein the catalyst solid and the alkenes polymerized onto it are present in a mass ratio of from 1:0.1 to 1:200.

7. A process for the preparation of polyolefins comprising polymerization or copolymerization of olefins by contacting the catalyst solid as claimed in claim 1.

8. A process as claimed in claim 7, wherein the olefin is propylene or the olafin is a mixture of propylene, ethylene and/or $C_2$–$C_{12}$-1-alkenes which mixture contains at least 50 mol % of propylene.

* * * * *

UNITED STATES PATENT AND TRADEMARK OFFICE
CERTIFICATE OF CORRECTION

| | | |
|---|---|---|
| PATENT NO. | : 7,094,724 B2 | Page 1 of 1 |
| APPLICATION NO. | : 10/297996 | |
| DATED | : August 22, 2006 | |
| INVENTOR(S) | : Fraaije et al. | |

It is certified that error appears in the above-identified patent and that said Letters Patent is hereby corrected as shown below:

In Claim 8, col. 34, line 31:
    "olafin" should read --olefin--

Signed and Sealed this

Seventeenth Day of April, 2007

JON W. DUDAS
*Director of the United States Patent and Trademark Office*